United States Patent
Chen et al.

(10) Patent No.: US 10,580,441 B1
(45) Date of Patent: Mar. 3, 2020

(54) MAGNETIC RECORDING ASSISTED BY TWO SPIN HALL EFFECT (SHE) LAYERS IN THE WRITE GAP

(71) Applicant: Headway Technologies, Inc., Milpitas, CA (US)

(72) Inventors: Wenyu Chen, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/370,634

(22) Filed: Mar. 29, 2019

(51) Int. Cl.
*G11B 5/37* (2006.01)
*G11B 5/48* (2006.01)
*G11B 5/60* (2006.01)

(52) U.S. Cl.
CPC .............. *G11B 5/37* (2013.01); *G11B 5/4826* (2013.01); *G11B 5/4833* (2013.01); *G11B 5/6082* (2013.01)

(58) Field of Classification Search
CPC ... G11B 5/11; G11B 5/187; G11B 2005/0005; G11B 5/37; G11B 5/4826; G11B 5/4833; G11B 5/6082
USPC .......................... 360/123.1–123.5, 235–235.5
See application file for complete search history.

(56) References Cited

U.S. PATENT DOCUMENTS

| | | | |
|---|---|---|---|
| 6,785,092 B2 | 8/2004 | Covington et al. | |
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |
| 7,835,111 B2 | 11/2010 | Flint et al. | |
| 7,957,098 B2 | 6/2011 | Yamada et al. | |

(Continued)

FOREIGN PATENT DOCUMENTS

| JP | 2002-133610 | 5/2002 |
|---|---|---|
| JP | 2002-298309 | 10/2002 |

(Continued)

OTHER PUBLICATIONS

PTO Office Action, U.S. Appl. No. 12/964,202, Applicant: Sasaki et al., dated Nov. 28, 2012, 11 pages.

(Continued)

*Primary Examiner* — Allen T Cao
(74) *Attorney, Agent, or Firm* — Saile Ackerman LLC; Stephen B. Ackerman

(57) ABSTRACT

A Spin Hall Effect (SHE) assisted magnetic recording device is disclosed wherein a stack of two SHE layers with an intermediate insulation layer is formed between a main pole (MP) trailing side and trailing shield (TS) bottom surface. Both of the SHE layers are a Spin Hall Angle (SHA) material with an absolute value for SHA>0.05. The SHE layers have front sides at the air bearing surface (ABS) or recessed therefrom, and backsides up to 80 nm from the ABS. Current ($I_{SHE}$) is applied in a cross-track direction and synchronized with the write current. A first SHE layer generates transverse spin transfer torque that tilts a local MP magnetization at the MP trailing side to enhance the MP write field, and the second SHE layer generates transverse spin transfer torque that tilts a local TS magnetization at the TS bottom surface to increase the TS return field.

41 Claims, 15 Drawing Sheets

(56) References Cited

U.S. PATENT DOCUMENTS

| | | | |
|---|---|---|---|
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,604,886 B2 | 12/2013 | Nikonov et al. |
| 8,634,163 B2 | 1/2014 | Tanabe et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,142,228 B2 | 9/2015 | Fujita et al. |
| 9,196,271 B1 * | 11/2015 | Shirotori | G11B 5/3109 |
| 9,230,571 B1 | 1/2016 | Chen et al. |
| 9,299,367 B1 | 3/2016 | Tang et al. |
| 9,361,912 B1 | 6/2016 | Liu et al. |
| 9,406,317 B1 | 8/2016 | Tang et al. |
| 9,466,319 B1 | 10/2016 | Tang et al. |
| 9,824,701 B2 | 11/2017 | Tang et al. |
| 9,934,797 B2 | 4/2018 | Takahashi et al. |
| 9,966,091 B2 | 5/2018 | Chen et al. |
| 10,032,469 B2 | 7/2018 | Lim et al. |
| 10,037,772 B2 | 7/2018 | Okamura et al. |
| 10,079,057 B2 | 9/2018 | Ozbay et al. |
| 10,141,037 B2 | 11/2018 | Ohsawa et al. |
| 10,181,334 B1 | 1/2019 | Song et al. |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada et al. |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2012/0292723 A1 | 11/2012 | Luo et al. |
| 2014/0071562 A1 | 3/2014 | Chen et al. |
| 2014/0177092 A1 | 6/2014 | Katada et al. |
| 2015/0043106 A1 | 2/2015 | Yamada et al. |
| 2016/0218728 A1 | 7/2016 | Zhu |
| 2017/0133044 A1 | 5/2017 | Lim et al. |
| 2018/0075868 A1 | 3/2018 | Koui et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 the Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

"Spin-Torque Switching with the Giant Spin Hall Effect of Tantalum," by Luqiao Liu et al., Science May 4, 2012: vol. 336, Issue 6081, pp. 555-558, DOI: 10.1126/science.1218197.

D'Yakonov, M. I., Spin Hall Effect. Int. J. Mod. Phys. B 23, 2556-2565 (2009).

"Spin-Torque Ferromagnetic Resonance Induced by the Spin Hall Effect," by Luqiao Liu et al, Physical Review Letters, PRL 106, 036601 (2011), Jan. 21, 2011, pp. 1-4.

"Surface assisted Spin Hall Effect in Au Films with Pt Impurities," by B. Gu et al., Physical Review Letters, PRL 105, 216401 (2010), Nov. 19, 2010, pp. 1-4.

\* cited by examiner

MAGNETIC RECORDING ASSISTED BY TWO SPIN HALL EFFECT (SHE) LAYERS IN THE WRITE GAP

RELATED PATENT APPLICATIONS

This application is related to the following: Ser. No. 16/209,151, filed on Dec. 4, 2018, and issued as U.S. Pat. No. 10,490,216; and Ser. No. 16/370,613 filed on Mar. 29, 2019; assigned to a common assignee, and herein incorporated by reference in their entirety.

TECHNICAL FIELD

The present disclosure relates to a Spin Hall Effect assisted magnetic recording (SHAMR) structure wherein two Spin Hall Effect (SHE) layers called SHE1 and SHE2 that are separated by an insulation layer and comprised of a positive or negative giant Spin Hall Angle (SHA) material are formed in the write gap between a main pole (MP) and trailing shield (TS), and wherein a current ($I_{SHE}$) is applied across the SHE layers through a circuit connected in series or parallel with a write current (Iw) circuit, or with a separate circuit, so that when $I_{SHE}$ is applied in a cross-track direction and is synchronized with Iw, transverse spin transfer torque is applied to a local MP magnetization at the MP/SHE1 interface and to a local TS magnetization at the SHE2/TS interface thereby enhancing the MP write field and TS return field, respectively, improving writer transition speed, and avoiding a high current threshold typical of other writer assist mechanisms.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR) where a spin torque device is employed to generate a high frequency field that helps writing. The latter is described by J-G. Zhu et al. in "Microwave Assisted Magnetic Recording", IEEE Trans. Magn., vol. 44, pp. 125-131 (2008). A third approach called STRAMR (spin torque reversal assisted magnetic recording) relies on spin torque to reverse a magnetization in a layer in the write gap (WG), for example, to increase reluctance and force more magnetic flux from the MP at the ABS. STRAMR is described in U.S. Pat. No. 6,785,092. Related patent application Ser. No. 16/209,151 describes a writer where the MAMR and STRAMR (spin flipping element) effects may exist simultaneously.

Spin transfer torque devices (also known as STO devices) are based on a spin-transfer effect that arises from the spin dependent electron transport properties of ferromagnetic-spacer-ferromagnetic multilayers. When current passes through a magnetic multilayer in a CPP (current perpendicular to plane) configuration, the first ferromagnetic (FM) layer will generate spin polarized currents as the electrons traverse the first FM layer. When the spin polarized current is transmitted through a polarization preservation spacer, the spin angular moment of electrons incident on a second FM layer interacts with magnetic moments of the second FM layer near the interface between the second FM layer and non-magnetic spacer. Through this interaction, the electrons transfer a portion of their angular momentum to the second FM layer. As a result, spin-polarized current can switch the magnetization direction of the second FM layer if the current density is sufficiently high.

Spin Hall Effect (SHE) is a physics phenomenon discovered in the mid $20^{th}$ century, and is described by M. Dyaknov et al. in Physics Lett. A, Vol. 35, 459 (1971). Similar to a regular Hall Effect where conduction carriers with opposite charges are scattered to opposite directions perpendicular to the current density due to a certain scattering mechanism, SHE causes electrons with opposite spins to be scattered to opposite directions perpendicular to the charge current density as a result of strong spin-orbit coupling in the conducting layer. As shown in FIG. 1, electrons pass through a non-magnetic conductor 2 with strong spin orbit interaction, and electrons 3a with spin in the negative x-axis direction are deflected to the +z-axis surface $2s1$ while electrons 3b with spin in the positive x-axis direction are deflected to the negative z-axis surface $2s2$. SHE is quantified by the Spin Hall Angle (SHA) defined as the ratio of the spin current in the direction transverse to the charge current (z-axis in FIG. 1) to the charge current (y-axis direction in FIG. 1). For many years after SHE was discovered, the absolute value of SHA materials evaluated was typically <0.01, and SHE had very limited applications in industry.

During the past 10 years, materials with substantially larger (giant) SHA have been found. B. Gu et al. in Phys. Rev. Lett. 105, 216401 (2010), and L. Liu et al. in Phys. Rev. Lett. 106, 036601 (2011) provided examples of SHA~0.07 in a Pt layer, and as large as 0.12 in a Au layer with Pt doping, and an application where giant transverse spin current is injected into an adjacent magnetic layer to induce ferromagnetic resonance by spin torque. A large but negative SHA of around −0.12 was found in β-Ta, meaning that electrons in the β-Ta layer are spin scattered in the opposite directions compared to what is shown in FIG. 1. SHE with the negative SHA material was also used to interact with an adjacent magnetic layer, and even flip a magnetization in a magnetic layer in a magnetic random access memory (MRAM) device without sending a current into the magnetic tunnel junction. The aforementioned applications using SHE, or spin orbit torque (SOT) in MRAM, are typically called SOT-MRAM, and can significantly reduce the reliability concern that is generally found in conventional spin torque transfer (STT)-MRAM.

All existing designs that assist magnetic recording have advantages, but also have disadvantages including a greater number of pads per head for all assisted designs, a reliability concern for TAMR, and a limited WG to fit a multilayer device in both MAMR and TAMR. Furthermore, a new assist scheme is desired where there is no current density threshold to initiate the assist mechanism, and where the stack of layer(s) used to provide the assist is formed with fewer process steps than in existing designs where a spin torque oscillator (STO) in MAMR or STRAMR usually has three or more layers, and requires at least one ion beam etch (IBE) or reactive ion etch (RIE) step.

SUMMARY

One objective of the present disclosure is to provide a SHE assisted magnetic recording scheme that provides better overwrite (OW), bit error rate (BER), and transition sharpness compared with existing magnetic recording assist designs.

A second objective of the present disclosure is to provide the SHE assisted magnetic recording (SHAMR) scheme of the first objective that also enables better device reliability and requires fewer fabrication steps than for STO devices.

A third objective of the present disclosure is to provide a SHAMR scheme that satisfies the first two objectives and also does not have a current threshold to begin the assist, or require additional pads for electrical connections.

According to a first embodiment of the present disclosure, these objectives are achieved by forming a stack where two SHE layers are separated with an insulation layer in a write gap, and where a first SHE layer (SHE1) has a bottom surface that interfaces with a MP trailing side, and a second SHE layer (SHE2) has a top surface that contacts a trailing shield (TS). In some embodiments, both of SHE1 and SHE2 are made of a positive giant SHA material such as Pt, or both are comprised of a negative giant SHA material such as β-Ta, and each has a front side at the ABS. In other embodiments, one of the SHE layers is a positive giant SHA material and the other of the SHE layers is a negative giant SHA material. Preferably, each SHE layer is comprised of a giant SHA material having an absolute value for SHA that is >0.05. The backside of each SHE layer may be at a height equal to the throat height (TH) of the trailing shield (TS), or at a height unequal to TH in other embodiments.

The present disclosure also encompasses embodiments where a front side of each SHE layer is recessed behind the ABS. Moreover, the recessed height of SHE1 may be unequal to the recessed height of SHE2. The insulation layer between the SHE layers is at least 3 nm thick, and may be a single layer or multilayer of one or more of AlOx, SiOx, MgO, AlNx, TiOx, or other dielectric materials used in the art. Each SHE layer is also insulated from other conducting layers including the side shields and leading shield to prevent electrical shorts.

When the SHE layers are comprised of a positive giant SHA material, a current ($I_{SHE}$) is applied in a cross-track direction (negative y-axis direction) through the SHE layers when the MP write field is aligned down (out of the ABS in a negative x-axis direction) toward a magnetic medium during a write process. Alternatively, $I_{SHE}$ is applied in a positive y-axis direction when the MP write field is in the negative x-axis direction, and a negative giant SHA material is employed in the SHE layers. In embodiments where SHE1 is a positive SHA material and SHE 2 is a negative SHA material, or vice versa, $I_{SHE}$ in the positive SHA material is in a negative y-axis direction and opposite to $I_{SHE}$ in the negative SHA material when the MP write field is pointing down toward a magnetic medium. $I_{SHE}$ direction is reversed in each of the aforementioned embodiments when the MP write field is pointing up and away from the ABS. A key feature is synchronization of the write current (Iw) waveform with $I_{SHE}$ during the writing of each transition so that the direction of Iw and $I_{SHE}$ are reversed simultaneously for each transition, and the writer's rise time is shortened.

Without a current in the SHE layers, the MP has a local magnetization at the MP/SHE1 interface that is aligned substantially in the direction of the write gap field ($H_{WG}$) that is either toward or away from the trailing shield depending on the transition being written. Similarly, the TS has a local magnetization at the TS/SHE2 interface that is substantially parallel to that of the local MP magnetization and to $H_{WS}$. The advantages of the present disclosure are realized when $I_{SHE}$ is applied and synchronized with Iw. Accordingly, SHE1 exerts a transverse spin transfer torque toward the MP/SHE1 interface that causes the MP local magnetization to tilt down and more towards the ABS, or more away from the ABS depending on the transition. Similarly, SHE2 generates a transverse spin transfer torque toward the TS/SHE2 layer interface that tilts the local TS magnetization up and away from the ABS, or toward the ABS depending on the transition. The result is a higher effective write field for better overwrite, and a higher TS return field that typically correlates to better BER.

Within a positive giant SHE layer, an Oersted field is also generated at the interfaces with the MP and TS that reinforces the transverse spin transfer torque to further boost the write field and return field, respectively. However, if a SHE layer that is a negative giant SHA material is used, the Oersted field cancels some of the transverse spin torque from the SHE layer, but the cancellation effect is small due to the transverse spin transfer torque having a substantially greater magnitude than the Oersted field.

In all of the aforementioned embodiments, the front sides of SHE1 and SHE2 are recessed at the same height or different heights from the ABS. Furthermore, each SHE layer may be comprised of at least two sub-layers made of different SHA materials in order to tune the current density in each sub-layer, and the magnitude of the resulting transverse spin transfer torque. Thus, with one or both of a larger $I_{SHE}$ and a larger absolute value for SHA, the amount of transverse spin torque on the local MP and TS magnetizations increases in each embodiment. Preferably, each SHE layer has a full width in the cross-track direction such that the far sides thereof are aligned with the far sides of the side shields.

Depending on the resistance of the SHE layers and the leads, the circuit used to apply $I_{SHE}$ may be in series or parallel with the Iw circuit. Optionally, the $I_{SHE}$ circuit may be independent from the Iw circuit. The SHAMR ($I_{SHE}$) current input may be across pads shared with the Iw circuit to minimize the number of electrical contact pads required in the recording head. Since the current $I_{SHE}$ is confined within a single layer, there is no concern with electromigration that is a fail mechanism when current is applied perpendicular to the planes of several layers in a STO device in MAMR and STRAMR designs.

A method is provided for forming a stack having two full width SHE layers separated by an insulation layer, and where SHE1 has a bottom surface contacting the MP trailing side, and SHE2 has a top surface that forms an interface with the TS bottom surface.

DETAILED DESCRIPTION

Figure 1:
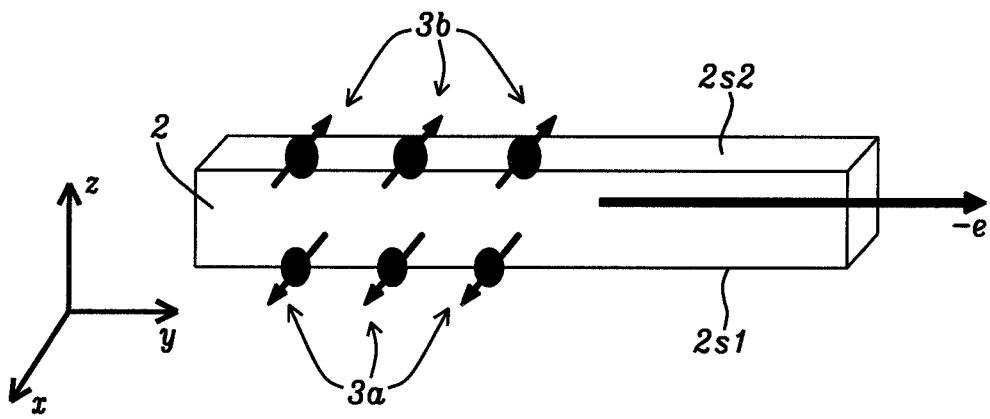
FIG. 1 is an oblique view of a conductor where a SHE layer made of a Spin Hall Angle (SHA) material has electrons with spin in the (−) x-axis direction that are deflected to the (+) z-axis surface, and electrons with spin in the (+) x-axis direction that are deflected to the (−) z-axis surface.

The present disclosure is a PMR writer based on SHAMR technology hereinafter referred to as a SHAMR device wherein a stack comprised of two SHE layers separated by an insulation layer is formed between a MP trailing side and a trailing shield so that when a current ($I_{SHE}$) is applied in a cross-track direction through the SHE layers and is synchronized with Iw during a write process, a transverse spin transfer torque is applied in a down-track direction to both of a local MP magnetization at a MP/SHE1 interface, and to a local TS magnetization at a TS/SHE2 interface to enhance the write field, and TS return field, respectively. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance orthogonal to the ABS in the x-axis direction. In some of the drawings, a magnetic bit is considerably enlarged over actual size in order to more easily depict a bit magnetization therein. A front side of a layer is a side at the ABS or facing the ABS, and a backside of a layer faces away from the ABS.

Figure 2:
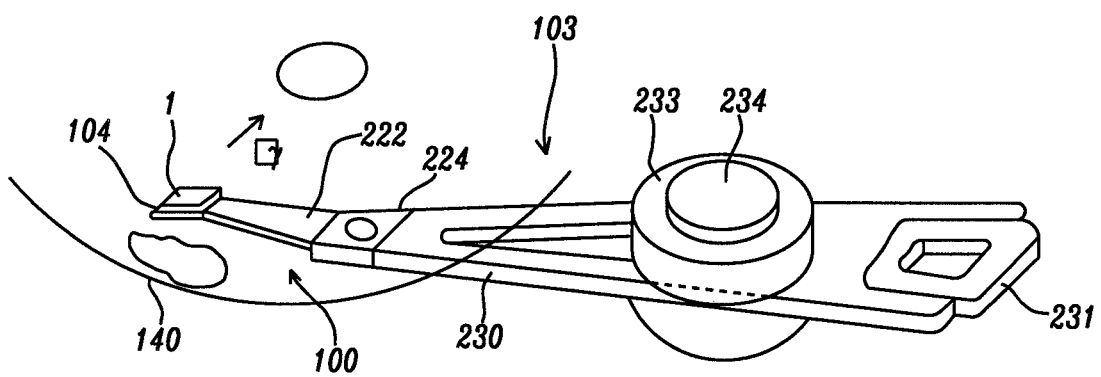
FIG. 2 is a perspective view of a head arm assembly of the present disclosure.

Referring to FIG. 2, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 3:
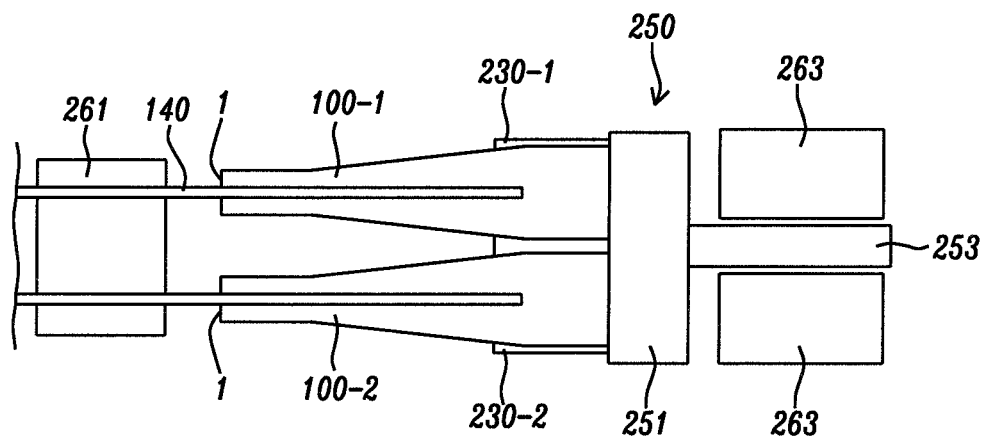
FIG. 3 is side view of a head stack assembly of the present disclosure.

Next, a side view of a head stack assembly (FIG. 3) and a plan view of a magnetic recording apparatus (FIG. 4) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 2) of the voice coil motor is mounted at the opposite side of each arm in carriage 251. The voice coil motor has a permanent magnet 263 arranged at an opposite position across the coil 231.

Figure 4:
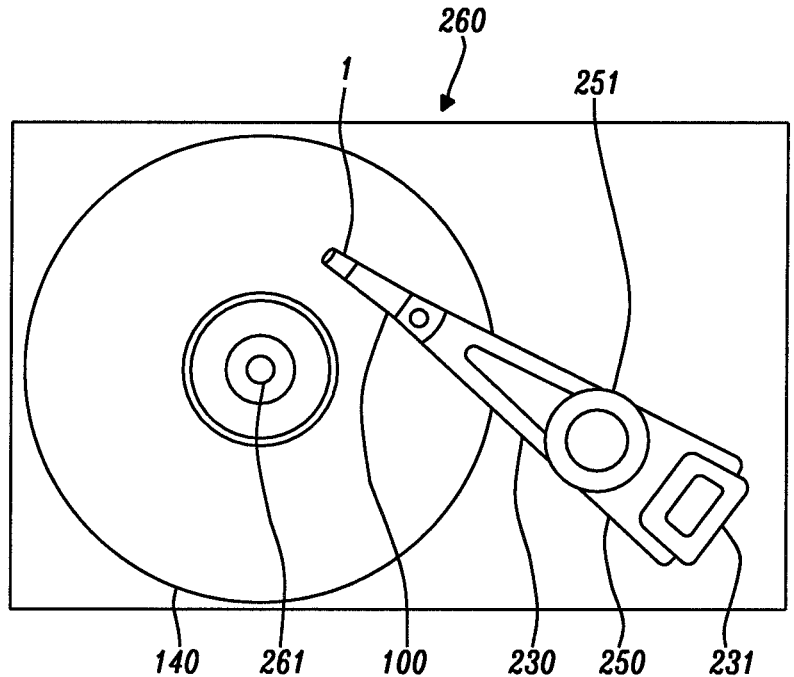
FIG. 4 is a plan view of a magnetic recording apparatus of the present disclosure.

With reference to FIG. 4, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 5:
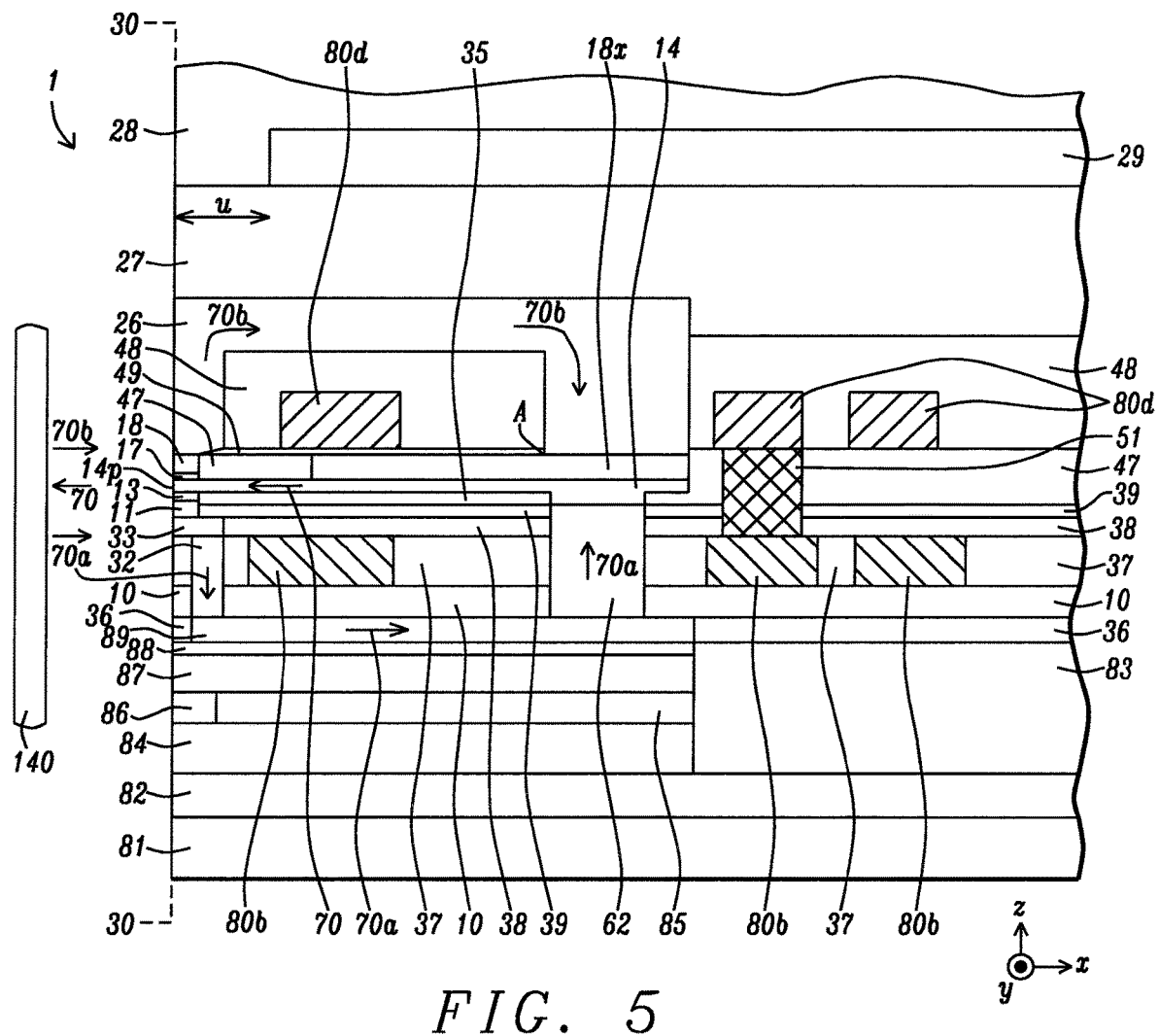
FIG. 5 is a down-track cross-sectional view of a combined read-write head with leading and trailing loop pathways for magnetic flux return to the main pole according to an embodiment of the present disclosure.

Referring to FIG. 5, magnetic recording head 1 comprises a combined read-write head. The down-track cross-sectional view is taken along a center plane (44-44 in FIG. 6A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) having a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 5 is typically considered as the read head. In other embodiments (not shown), the read head may have a dual reader design with two MR sensors, or a multiple reader design with multiple MR sensors.

The present disclosure anticipates that various configurations of a write head (SHAMR writer) may be employed with the read head portion. In the exemplary embodiment, magnetic flux 70 in main pole (MP) layer 14 is generated with flowing a current called Iw (not shown) through bucking coil 80b and driving coil 80d that are below and above the main pole layer, respectively, and are connected by interconnect 51. Magnetic flux (write field) 70 exits the main pole layer at pole tip 14p at the ABS 30-30 and is used to write a plurality of bits on magnetic media 140. Magnetic flux (return field) 70b returns to the main pole through a trailing loop comprised of trailing shield 17, write shield 18, PP3 shield 26, and top yoke 18x. There is also a leading return loop for magnetic flux 70a that includes leading shield 11, leading shield connector (LSC) 33, S2C (S2 connector) 32, return path 89, and back gap connection (BGC) 62. The magnetic core may also comprise a bottom yoke 35 below the main pole layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 6A:
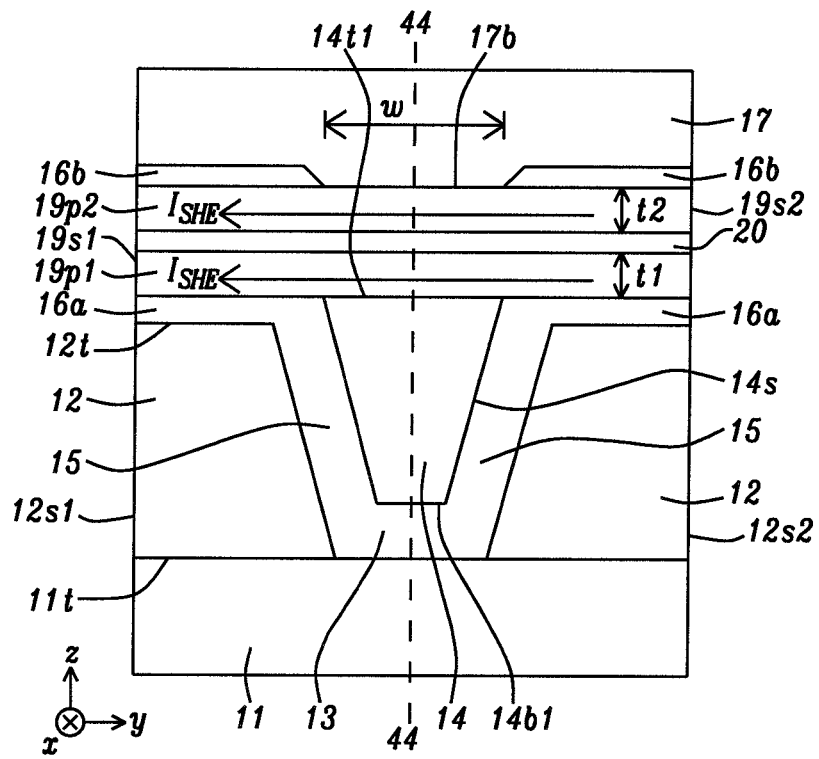
FIG. 6A is an ABS view of a PMR writer according to an embodiment of the present disclosure where two SHE layers (positive SHA material) are formed in the write gap, and a first SHE layer has bottom surface contacting a MP trailing side while the second SHE layer has a top surface adjoining the TS bottom surface.

Referring to FIG. 6A, an ABS view of the SHAMR write head structure proximate to main pole (MP) 14 is depicted according to an embodiment of the present disclosure. There is a side gap 15 adjoining MP side 14s on each side of center plane 44-44. Each side shield (SS) has an inner side adjoining a side gap, and an outer side 12s1 or 12s2. A first write gap (WG) layer 16a is formed on SS top surface 12t, and has a top surface coplanar with a front edge of MP trailing side 14t1 at the ABS. Leading shield 11 has top surface 11t contacting a bottom of each side shield, and a bottom of lead gap 13. The lead gap fills the space between MP leading side 14b1 and the leading shield. A key feature is the stack comprised of lower SHE1 19p1, middle insulation layer 20, and upper SHE2 19p2 formed on the MP trailing side, and on WG layer 16a on each side of the center plane. Here, SHE1 19p1, and SHE2 19p2 with far sides 19s1, 19s2 are made of a positive SHA material and have a thickness t1, t2, respectively, where t1 is not necessarily equal to t2. As described in a later section, it is believed that transverse spin transfer torque generated by SHE1 and SHE2 is optimized when both t1 and t2 are <12 nm. Preferably, each of t1 and t2 is from 4 nm to 12 nm. In related patent application HT18-047, we disclosed SHAMR embodiments where one of t1 and t2 is zero so that a single SHE layer is formed in the WG. In the present disclosure, the insulation layer has a down-track thickness of at least 3 nm to prevent an electrical connection between SHE1 and SHE2.

In subsequent embodiments depicted in FIGS. 7C-7D, FIGS. 8C-8D, FIGS. 9A-9D, and FIGS. 11A-11B, one or both of SHE1 and SHE2 may be comprised of a negative SHA material and labeled as 19n1, 19n2, respectively.

Returning to FIG. 6A, TS 17 has a bottom surface 17b contacting a center portion of SHE2 19p2 in a region of width w of about 30 nm to 150 nm that is bisected by the center plane 44-44. A second WG layer 16b is formed on outer portions of the SHE2 top surface at distances greater than ½w from the center plane. $I_{SHE}$ is synchronized with Iw (not shown) as explained later and is in a negative cross-track (negative y-axis) direction orthogonal to the center plane when the MP write field 70 is pointing down (out of the ABS plane) as in FIG. 6B.

Figure 6B:
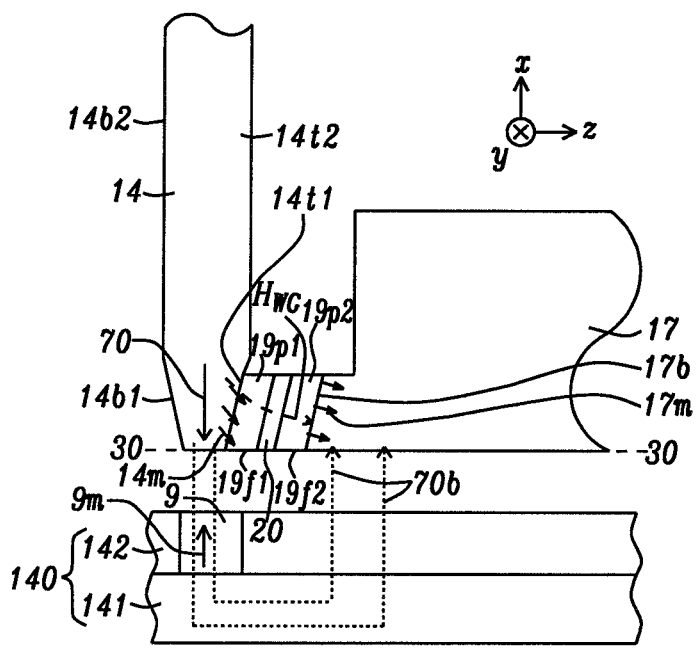
FIG. 6B is a down-track cross-sectional view at the center plane of the PMR writer in FIG. 6A where the MP has a write field pointing down in order to overwrite a bit magnetization pointing up in a magnetic medium according to an embodiment of the present disclosure.

As shown in FIG. 6B, MP 14 has a sufficiently large magnetic (write) field 70 to overwrite a media bit 9 with magnetization 9m on medium 140. In a normal write process, the MP needs to be driven with a coil current so that the MP write field 70 is pointing down to overwrite a medium bit 9 having a magnetization 9m pointing up. Magnetic flux in the MP write field proceeds from the MP through the ABS 30-30 and into medium bit layer 142 and soft underlayer (SUL) 141. A portion of the flux 70b that exits the magnetic medium is collected by trailing shield (TS) 17 and then returns to the MP through a trailing loop (shown in FIG. 5). SHE1 19p1 and SHE2 19p2 have front sides 19f1, 19f2, respectively, at the ABS. SHE1 contacts the MP tapered trailing side 14t1, which connects with a MP top surface 14t2 that is aligned orthogonal to the ABS. SHE2 adjoins TS bottom surface 17b. The MP leading side 14b1 is generally tapered and connects with the MP bottom surface 14b2. Write gap field $H_{wg}$ is shown across SHE1 and SHE2 in a direction from the MP to TS 17. Thus, a local MP field 14m proximate to MP trailing side 14t1, and a local TS field 17m proximate to the TS bottom surface are pointing substantially in the same direction as $H_{WG}$.

Figure 7A:
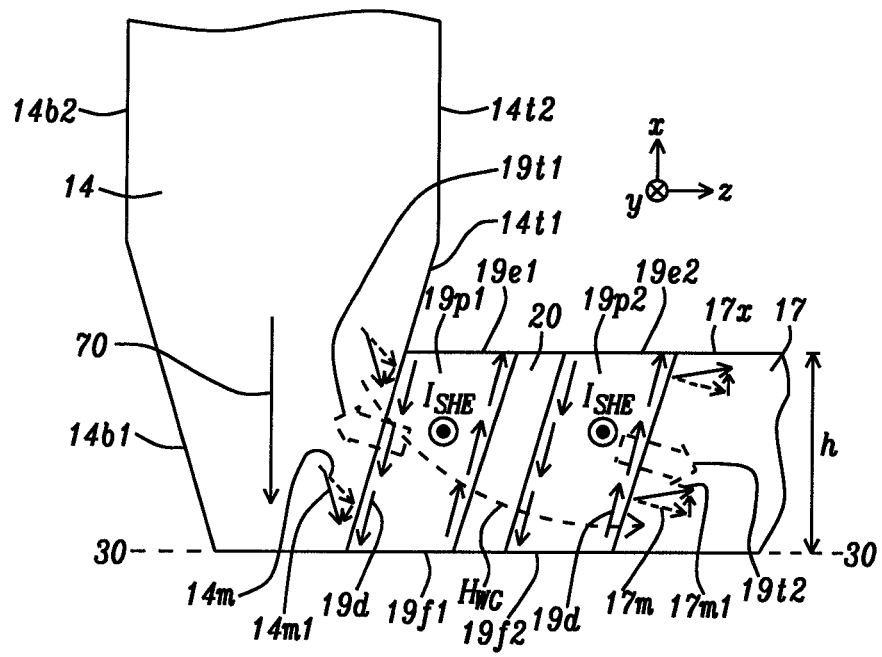
FIG. 7A and FIG. 7B show transverse spin transfer torque applied to a MP magnetization by the first SHE layer, and to a TS magnetization by the second SHE layer in FIG. 6A when the MP write field is pointing down (towards the ABS) and up, respectively, according to an embodiment of the present disclosure.

Referring to FIG. 7A, a down-track cross-sectional view of the SHAMR writer in FIGS. 6A-6B is shown according to a first embodiment of the present disclosure. As mentioned earlier, SHE1 19p is made of a positive giant SHA material and contacts the MP trailing side 14t1 while SHE2 19p2 is also comprised of a positive giant SHA material and adjoins TS bottom surface 19b. SHE1 has a front side 19f1 at the ABS, and a backside 19e1 essentially at the TS throat height h corresponding to the distance of TS backside 17x from the ABS 30-30. Meanwhile, SHE2 has a front side 19f2 at the ABS, and a backside 19e2 at height h. In other embodiments, backsides 19e1, 19e2 may be at a height less than h. When Iw induces a MP write field 70 pointing out of the ABS toward a magnetic medium (not shown), current $I_{SHE}$ is applied out of the plane of the paper and in the negative cross-track (negative y-axis) direction in SHE1 and SHE2 in order for SHE1 to generate a transverse spin transfer torque 19t1 that is substantially orthogonal to and pointing toward MP trailing side 14t1, and for SHE2 to produce a transverse spin transfer torque 19t2 that is substantially orthogonal to and pointing toward TS bottom surface 17b.

Local MP magnetization 14m is generally in the same direction as the write gap field $H_{WS}$ before $I_{SHE}$ is applied and synchronized with Iw as explained layer. As a result of transverse spin transfer torque 19t1, the local MP magnetization is tilted downward and toward the ABS (and more parallel to MP write field 70) indicated by arrow 14m1 and effectively enhances the MP write field 70. Simultaneously, transverse spin transfer torque 19t2 tilts local TS magnetization 17m upward (more orthogonal to the ABS) indicated by arrow 17m1, which enhances the TS return field (70b in FIG. 6B). Note that the Oersted field 19d is produced within SHE1 and SHE2 and adjacent to MP trailing side 14t1 and TS bottom surface 17b, respectively, and also provides an assist effect (smaller than the SHE assist) in enhancing the write field and TS return field. The Oersted field direction proximate to the MP/SHE1 interface is toward the ABS 30-30, and assists with tilting local MP magnetization 14m downward. Meanwhile, Oersted field direction proximate to the SHE2/TS interface is upward and away from the ABS, and assists with tilting local TS magnetization 17m upward to position 17m1.

The mechanism for the SHE assist is explained as follows. Conduction electrons in $I_{SHE}$ that carry spin downward in SHE1 propagate to the MP trailing side 14t1, and SHE1 conduction electrons with upward spin propagate to the interface with insulation layer 20. The spin angular momentum of the downward spin current interacts with the local MP magnetization 14m as depicted by transverse spin transfer torque 19t1. SHE2 conduction electrons with upward spin propagate to the TS bottom surface 17b, and the spin angular momentum of the upward spin current interacts with local TS magnetization 17m as shown by transverse spin transfer torque 19t2. The resulting increase in TS return field typically correlates to improved BER. Moreover, as the SHE1 and SHE2 rise time is around 1 picosecond to tens of picoseconds and substantially shorter than the writer's rise time, the SHAMR writer transition speed will be significantly improved with the SHE1 assist as described with respect to FIG. 13 in a later section. The write pattern's transition sharpness will also be improved. Preferably, SHE1 thickness t1 and SHE2 thickness t2 depicted in FIG. 6A are <12 nm since the L. Liu reference mentioned earlier indicates that a SHE assist (transverse spin torque applied to an adjacent magnetic layer) is reduced when the giant SHA material has a thickness>12 nm.

Figure 7B:
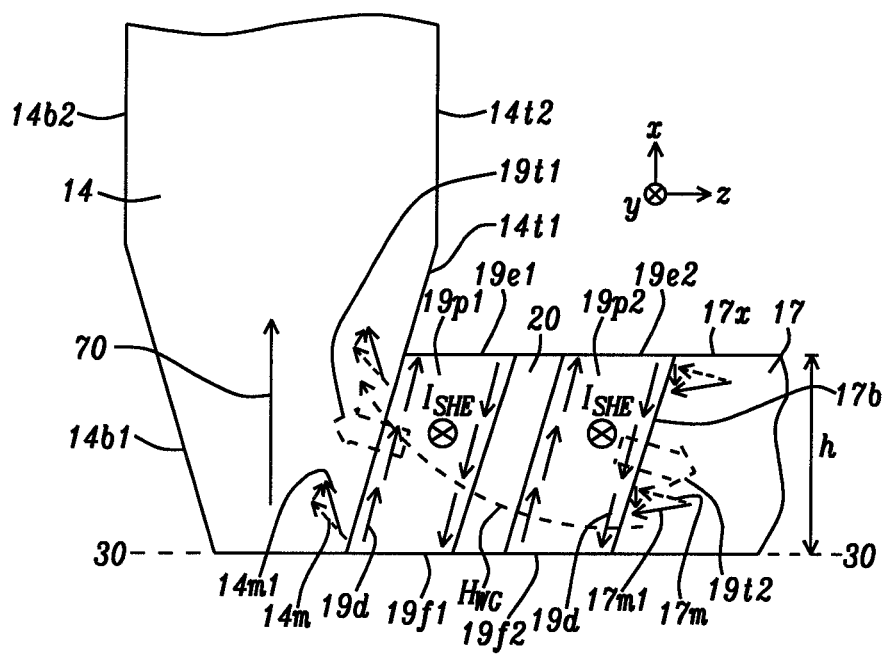

Referring to FIG. 7B, an alternative embodiment is shown where the direction of $I_{SHE}$ in SHE1 19p1 and in SHE2 19p2 is reversed compared with FIG. 7A when the MP write field 70 is pointing up (away from the ABS 30-30) in order to overwrite a bit magnetization pointing down in a magnetic medium (not shown). Note that the WG field $H_{WS}$ is also reversed and is now pointing in the general direction of TS 17 to MP 14. Local MP magnetization 14m and local TS magnetization 17m are substantially in the same direction as $H_{WS}$. In this case, SHE1 generates transverse spin transfer torque 19t1 and together with Oersted field 19d that is proximate to the MP/SHE1 interface advantageously tilt local MP magnetization 14m upward to position 14m1 (that is more parallel to the MP write field) to enhance the MP write field. Moreover, SHE2 produces transverse spin transfer torque 19t2 and together with Oersted field 19d proximate to the SHE2/TS interface is effective in tilting local TS magnetization 17m downward to position 17m1 that is more orthogonal to the ABS thereby enhancing the TS return field. Therefore, all benefits of the first embodiment shown in FIG. 7A are also realized in the alternative embodiment depicted in FIG. 7B.

Figure 7C:
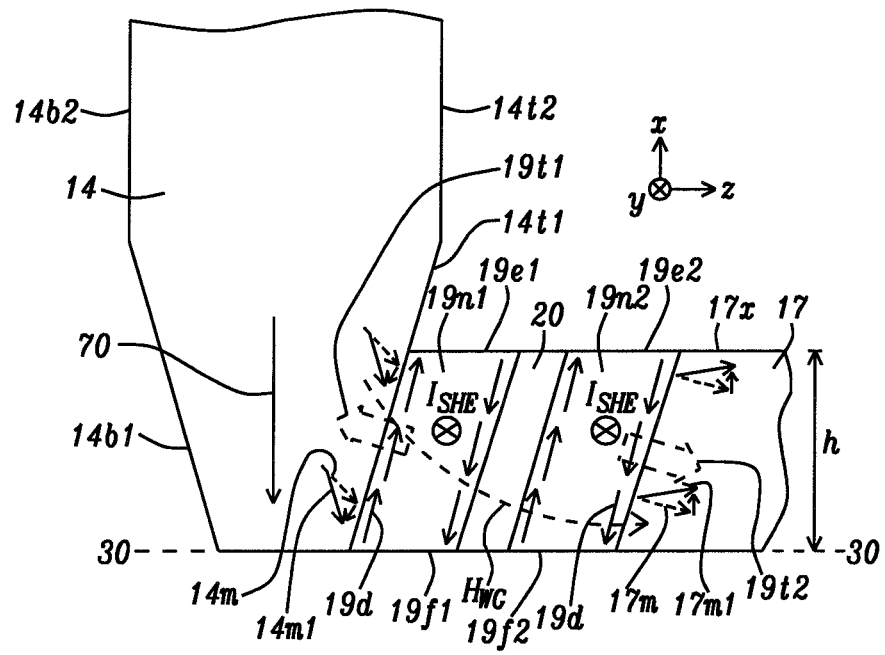
FIG. 7C and FIG. 7D are down-track cross-sectional views showing alternative embodiments to FIG. 7B and FIG. 7A, respectively, where the positive SHA material is replaced with a negative SHA material in the SHE layers and the current $I_{SHE}$ is reversed.

As shown in FIG. 7C, the present disclosure also encompasses an embodiment where SHE1 19p1 and SHE2 19p2 are replaced by SHE1 19n1 and SHE2 19n2, respectively, that are made of a negative giant SHA material. The same advantageous results of enhanced write field and better TS return field are realized as in FIG. 7A. However, $I_{SHE}$ must be applied through each of SHE1 and SHE2 in a direction that is into the plane of the paper when the MP write field 70 is pointing down toward ABS 30-30. In the exemplary embodiment, $I_{SHE}$ is in the positive cross-track direction. Again, transverse spin transfer torque 19t1 and 19t2 generated by SHE1 and SHE2, respectively, tilt the local MP magnetization downward from initial position 14m to position 14m1, and tilt local TS magnetization upward from initial position 17m to 17m1, respectively, when $I_{SHE}$ is synchronized with Iw. However, with a negative SHA material in SHE1 and SHE2, the Oersted field 19d is substantially in a direction opposite to magnetizations 14m1, 17m1 and thereby diminishes the SHE assist. Since the Oersted field is considerably smaller than transverse spin transfer torque 19t1, 19t2, the reduction to the SHE assist is not substantial.

Figure 7D:
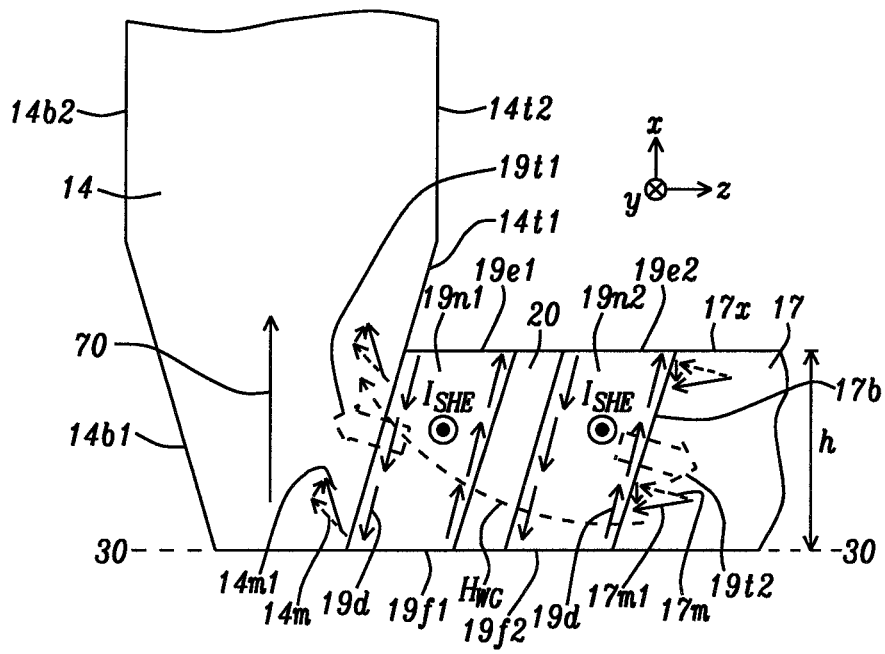

FIG. 7D is an alternative embodiment to the SHAMR structure in FIG. 7C where all aspects are retained except the MP write field 70 is pointing up from the ABS 30-30 to overwrite a bit magnetization pointing down in a magnetic medium (not shown). Furthermore, the direction of HWG, Oersted field 19d, local MP magnetization 14m, and local TS magnetization 17m are reversed compared with FIG. 7C. Accordingly, $I_{SHE}$ direction in SHE1 19n1 is reversed compared with FIG. 7C in order for SHE1 to produce transverse spin transfer torque 19t1 that tilts local MP magnetization upward to enhance the MP write field. Likewise, $I_{SHE}$ direction in SHE2 19n2 is reversed compared with FIG. 7C so that transverse spin transfer torque 19t2 is generated to cause local TS magnetization 17m to tilt downward toward the ABS to give magnetization 17m1 thereby enhancing the TS return field.

Unlike a current threshold requirement for assist effects to occur with SOT-MRAM or STT-MRAM, there is no $I_{SHE}$ current threshold in the SHAMR embodiments of the present disclosure. This advantage is related to the fact that injected spin current in SHE1 and SHE2 always carries spin direction parallel to the MP/SHE1 and SHE2/TS interfaces and is substantially orthogonal to the local MP magnetization 14m and local TS magnetization 17m, respectively. The magnitude of the transverse spin transfer torque 19t1, 19t2 increases as $I_{SHE}$ is increased. Maximum transverse spin transfer torque occurs when local MP magnetization 14m1 is parallel to MP trailing side 14*t*1, and when local TS magnetization 17*m*1 is parallel to TS bottom surface 17*b*.

In all of the aforementioned embodiments, the Oersted field 19*d* is on the order of tens of Oe, and is considerably less that the SHE assist (transverse spin transfer torque 19*t*1 and 19*t*2) when SHE1 and SHE2 are comprised of a giant SHA material.

Figure 8A:
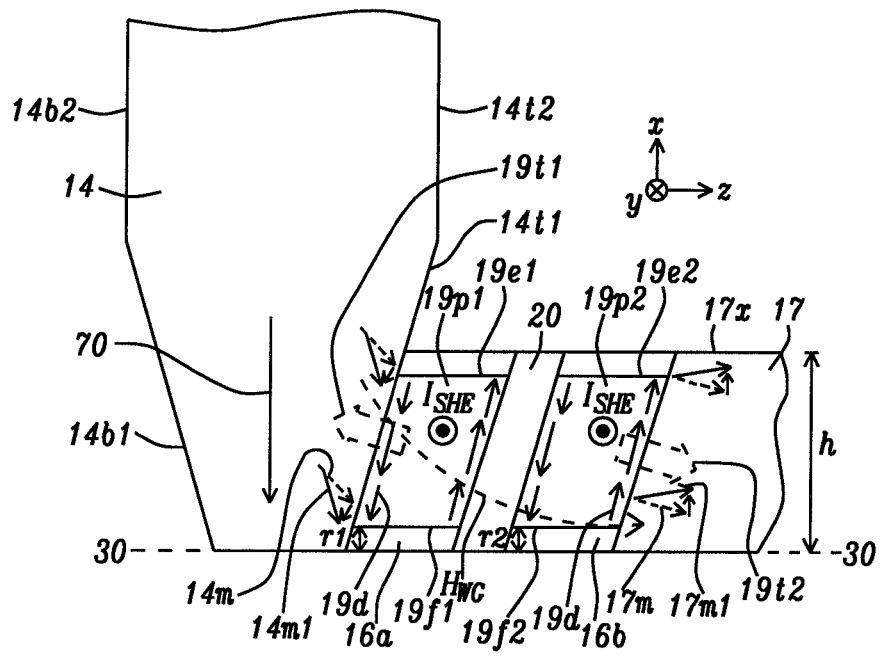
FIG. 8A and FIG. 8B are down-track cross-sectional views depicting embodiments wherein the SHE layers in FIG. 7A and FIG. 7B, respectively, are modified such that each SHE layer has a front side that is recessed behind the ABS, and a backside at a different height than that of the TS backside.

Referring to FIG. 8A, a second embodiment of the present disclosure is depicted where SHE1 19*p*1 and SHE2 19*p*2 described previously with regard to the first embodiment in FIG. 7A are modified so that SHE1 front side 19*f*1 is recessed to a height r1, and SHE2 front side 19*f*2 is recessed to height r2. Both r1 and r2 are 20 nm to 80 nm from the ABS 30-30, and preferably <60 nm. In some embodiments, r1 is unequal to r2. SHE1 and SHE2 backsides 19*e*1 and 19*e*2, respectively, may be at a height less than h (typically <80 nm) for TS backside 17*x*, or maintained at height h. Otherwise, all aspects of the first embodiment are retained including generation of transverse spin transfer torque 19*t*1 and 19*t*2 on local MP magnetization 14*m* and local TS magnetization 17*m*, respectively, such that the resulting MP magnetization 14*m*1 enhances write field 70, and TS magnetization 17*m*1 boosts the TS return field. A portion of the write gap shown as WG 16*a* is formed between the ABS and the SHE1 front side, and a WG portion shown as WG 16*b* is formed between the ABS and the SHE2 front side. Each of WG 16*a*, WG 16*b*, and insulation layer 20 may be a single layer or multilayer including but not limited to AlOx, SiOx, MgO, AlNx, TiOx, and other insulating oxides and nitrides used in the art.

Figure 8B:
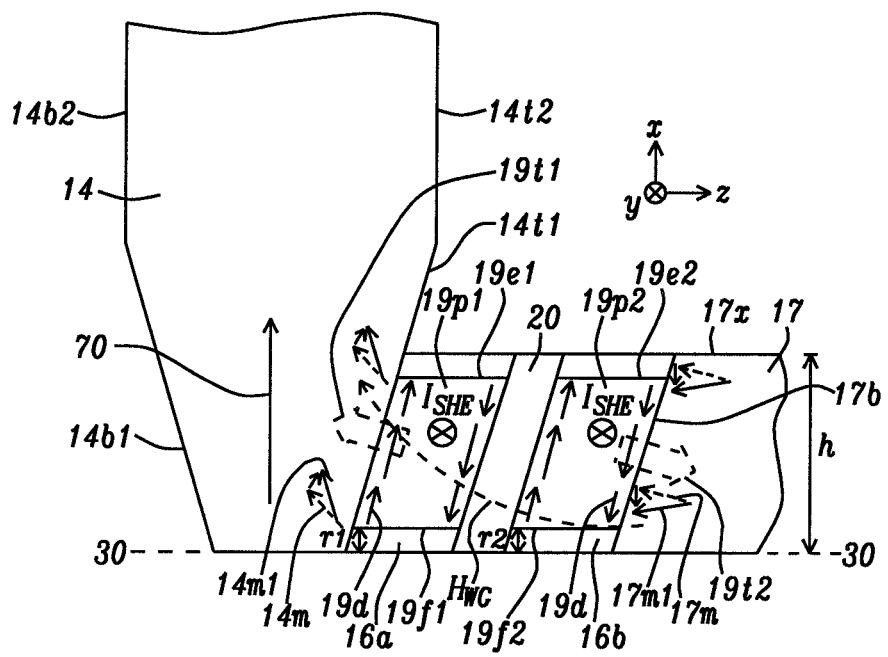

FIG. 8B represents a modification of the FIG. 8A embodiment where the MP write field 70 is pointing up from the ABS 30-30 rather than downward. Accordingly, $I_{SHE}$ direction is reversed in SHE1 19*p*1 and in SHE2 19*p*2 compared with the FIG. 8A embodiment such that $I_{SHE}$ is into the plane of the paper in order to generate transverse spin transfer torque 19*t*1 and 19*t*2, respectively. Therefore, the advantageous result is local MP magnetization 14*m* is tilted upward to yield MP magnetization 14*m*1 to enhance the MP write field, and local TS magnetization 17*m* is tilted downward to provide TS magnetization 17*m*1 to improve the TS return field. Again, Oersted field 19*d* proximate to the MP trailing side 14*t*1 and to TS bottom surface 17*b* reinforces the spin transfer torque 19*t*1 and 19*t*2, respectively.

Figure 8C:
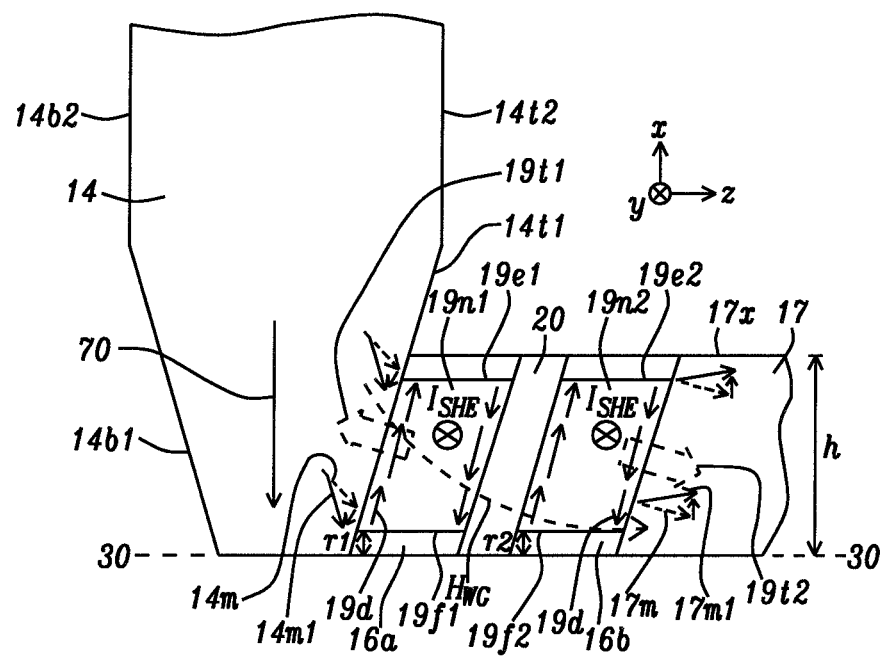
FIG. 8C and FIG. 8D are down-track cross-sectional views depicting embodiments wherein the SHE layers in FIG. 7C and FIG. 7D, respectively, are modified such that each SHE layer has a front side that is recessed behind the ABS, and a backside at a different height than that of the TS backside.

In FIG. 8C, SHE1 19*n*1 and SHE2 19*n*2 described previously with regard to the FIG. 7C embodiment are modified to have SHE1 front side 19*f*1 and SHE2 front side 19*f*2 that are recessed to height r1 and r2, respectively, from the ABS 30-30. In the exemplary embodiment, backsides 19*e*1, 19*e*2 are unequal to height h of the TS backside 17*x*. Optionally, backsides 19*e*1 and 19*e*2 may be maintained at height h. All aspects and advantages of the first embodiment in FIG. 7C are retained with recessed SHE1 and SHE2 in FIG. 8C. Furthermore, there is expected to be less wear and improved reliability when SHE1 and SHE2 are recessed from the ABS. In this case, WG 16*a* is formed between the ABS and SHE1 front side, and WG 16*b* is between the ABS and the SHE2 front side.

Figure 8D:
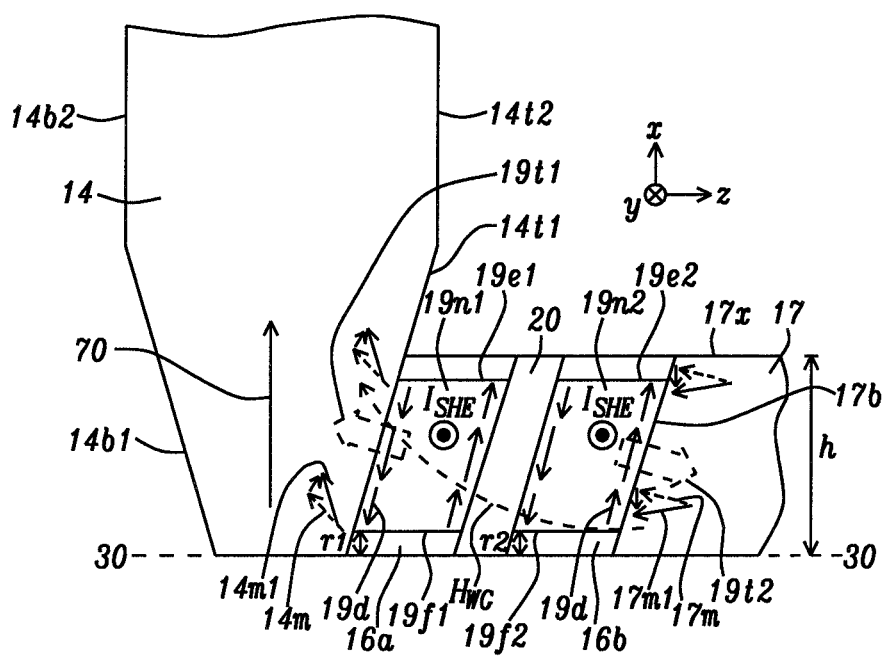

FIG. 8D represents a modification of the FIG. 8C embodiment where the MP write field 70 is pointing up from the ABS 30-30 rather than downward. Also, the directions of $H_{WG}$, Oersted field 19*d*, MP magnetization 14*m*, and TS magnetization 17*m* are reversed compared with FIG. 8C. Accordingly, $I_{SHE}$ direction is reversed in SHE1 19*n*1 and in SHE2 19*n*2 compared with FIG. 8C such that $I_{SHE}$ is out of the plane of the paper in order to generate transverse spin transfer torque 19*t*1 and 19*t*2, respectively. As a result, local MP magnetization 14*m* is tilted upward to yield MP magnetization 14*m*1 to enhance the MP write field, and local TS magnetization 17*m* is tilted downward to provide TS magnetization 17*m*1 to improve the TS return field. Again, Oersted field 19*d* tends to counteract the SHE assist, but not to a significant extent.

Figure 9A:
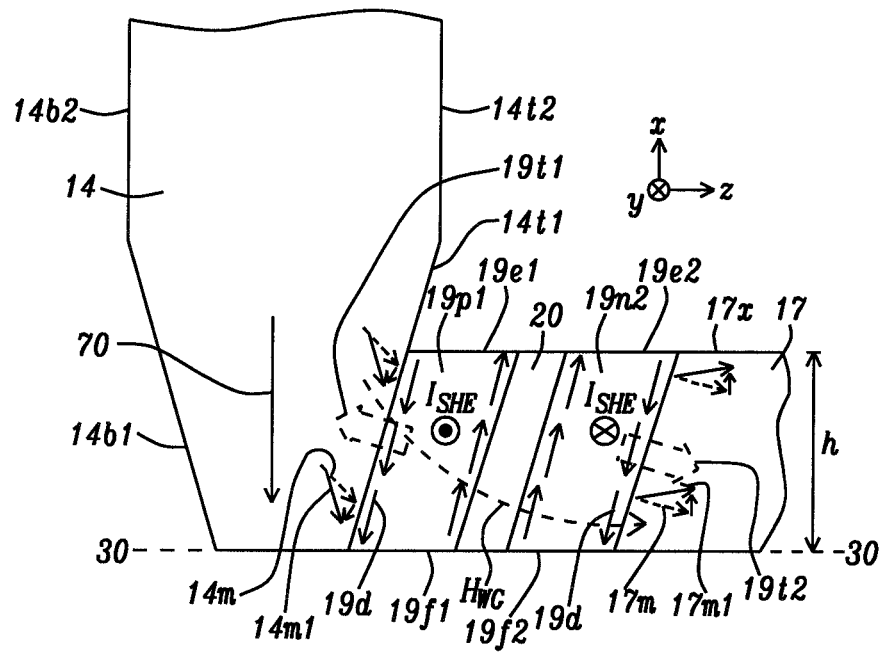
FIG. 9A and FIG. 9B are down-track cross-sectional views showing alternative embodiments to FIG. 7A and FIG. 7B, respectively, where a positive SHA material is replaced with a negative SHA material in the second SHE layer, and $I_{SHE}$ has a different direction in the first and second SHE layers.

In FIG. 9A, a third embodiment of the present disclosure is illustrated and is a modification of the first embodiment where SHE2 19*p*2 is replaced with SHE2 19*n*2 so that SHE1 is made of a positive SHA material while SHE2 is a negative SHA material. Otherwise, all aspects of the first embodiment in FIG. 7A are retained except $I_{SHE}$ in SHE2 flows into the plane of the paper and opposite to $I_{SHE}$ in SHE1 and Oersted field 19*d* is in the opposite direction by replacing a positive giant SHA material with a negative giant SHA material in SHE2. Thus, $I_{SHE}$ in SHE1 is in a negative cross-track direction while $I_{SHE}$ in SHE2 is in a positive cross-track direction when the write field 70 is in the direction from MP 14 to the magnetic medium (not shown). Transverse spin transfer torque 19*t*1 from SHE1 with adjacent Oersted field 19*d* tilt MP magnetization 14*m* downward to yield MP magnetization 14*m*1 to enlarge the MP write field, and transverse spin transfer torque 19*t*2 from SHE2 with adjacent Oersted field 19*d* tilt TS magnetization 17*m* upward to provide TS magnetization 17*m*1 to increase the TS return field.

Figure 9B:
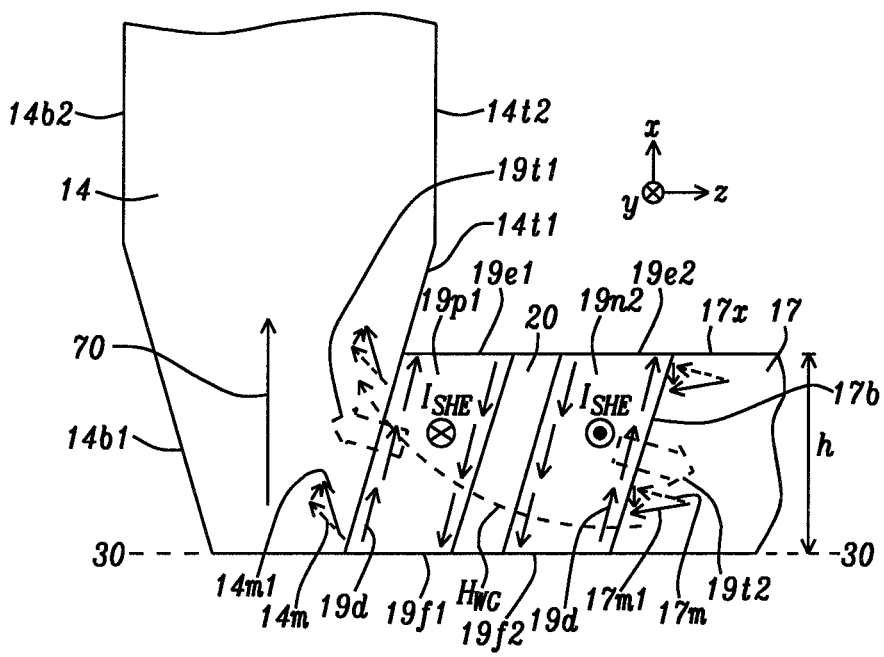

FIG. 9B illustrates an alternative third embodiment where all aspects of the FIG. 9A embodiment are retained except MP write field 70 is pointing up from the ABS 30-30, and $H_{WG}$, Oersted field 19*d*, as well as MP magnetization 14*m*, and TS magnetization 17*m* are in the opposite direction compared with FIG. 9A. Likewise, $I_{SHE}$ in each of SHE1 19*p*1 and SHE2 19*n*2 are reversed to be into the plane of the paper and out of the plane of the paper, respectively. It should be understood in all embodiments that when the MP write field is reversed from one transition to the next, then $I_{SHE}$ in each of SHE1 and SHE2 must also be reversed in order to generate transverse spin transfer torque 19*t*1, 19*t*1, respectively, that will cause the desired tilt in MP magnetization 14*m* and TS magnetization 17*m* to enhance the MP write field, and TS return field, respectively.

Figure 9C:
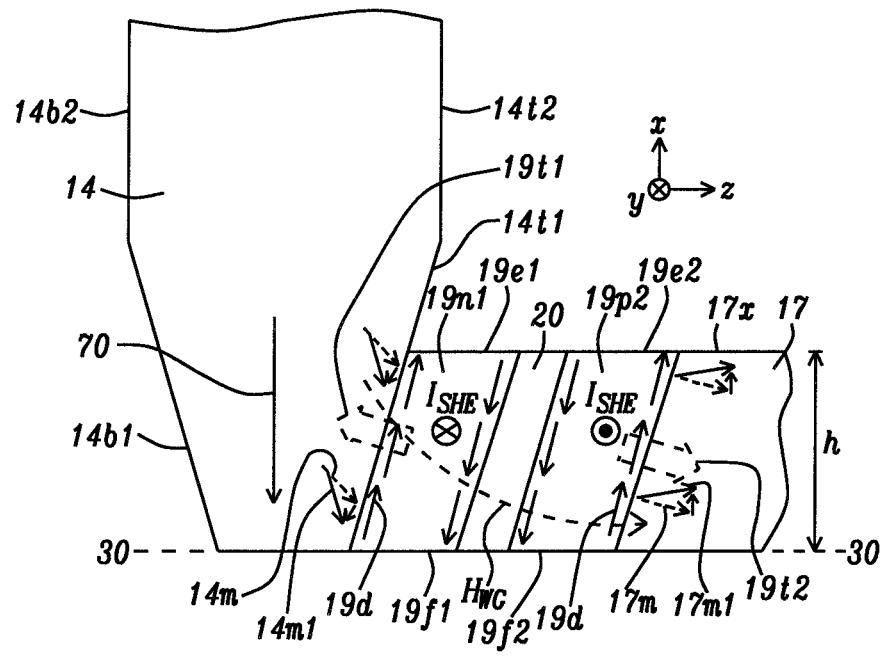
FIG. 9C and FIG. 9D are down-track cross-sectional views showing alternative embodiments to FIG. 7C and FIG. 7D, respectively, where a positive SHA material is replaced with a negative SHA material in the first SHE layer, and $I_{SHE}$ has a different direction in the first and second SHE layers.

FIG. 9C depicts a fourth embodiment that is a modification of FIG. 9A where the positions of the positive and negative SHE layers are switched such that SHE1 19*n*1 is a negative SHA material that contacts the MP trailing side 14*t*1, and SHE2 19*p*2 is a positive SHA material that adjoins the TS bottom surface 17*b*. In this case, $I_{SHE}$ in SHE1 is into the plane of the paper (positive cross-track direction) while $I_{SHE}$ in SHE2 is out of the plane of the paper in order to generate the desired transverse spin transfer torque 19*t*1 and 19*t*2, respectively. All benefits of the FIG. 9A embodiment are also realized in the FIG. 9C embodiment.

Figure 9D:
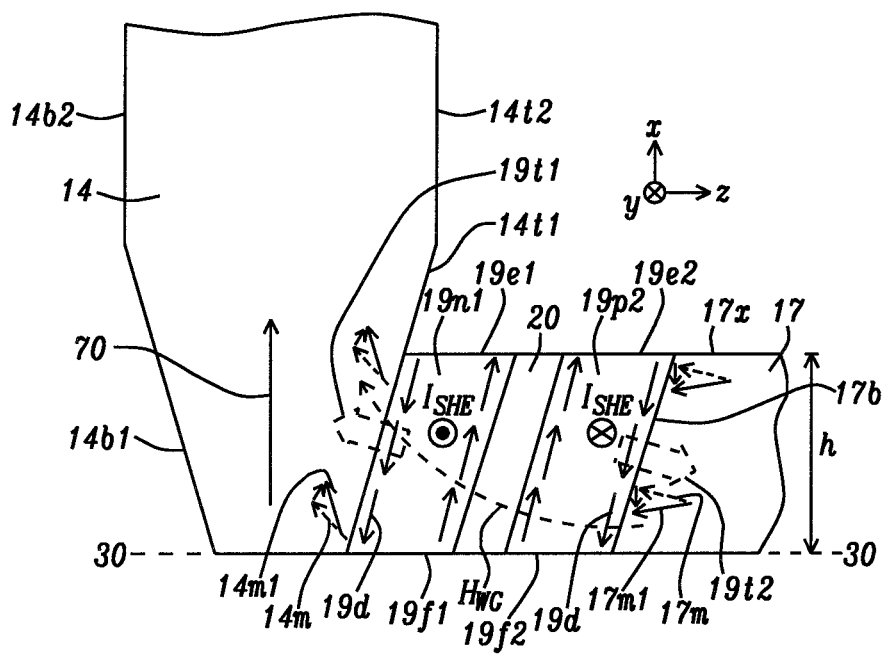

FIG. 9D illustrates an alternative fourth embodiment where all aspects of the FIG. 9C embodiment are retained except MP write field 70 is pointing up from the ABS 30-30, and $H_{WS}$, Oersted field 19*d*, as well as MP magnetization 14*m*, and TS magnetization 17*m* are in the opposite direction compared with FIG. 9C. $I_{SHE}$ in each of SHE1 19*n*1 and SHE2 19*p*2 is reversed to a negative cross-track direction and positive cross-track direction, respectively. Accordingly, transverse spin transfer torque 19*t*1 and 19*t*2 is generated to cause the desired tilt in MP magnetization 14*m* that enlarges the MP write field, and a tilt in TS magnetization 17*m* that enhances the TS return field, respectively.

Figure 10A:
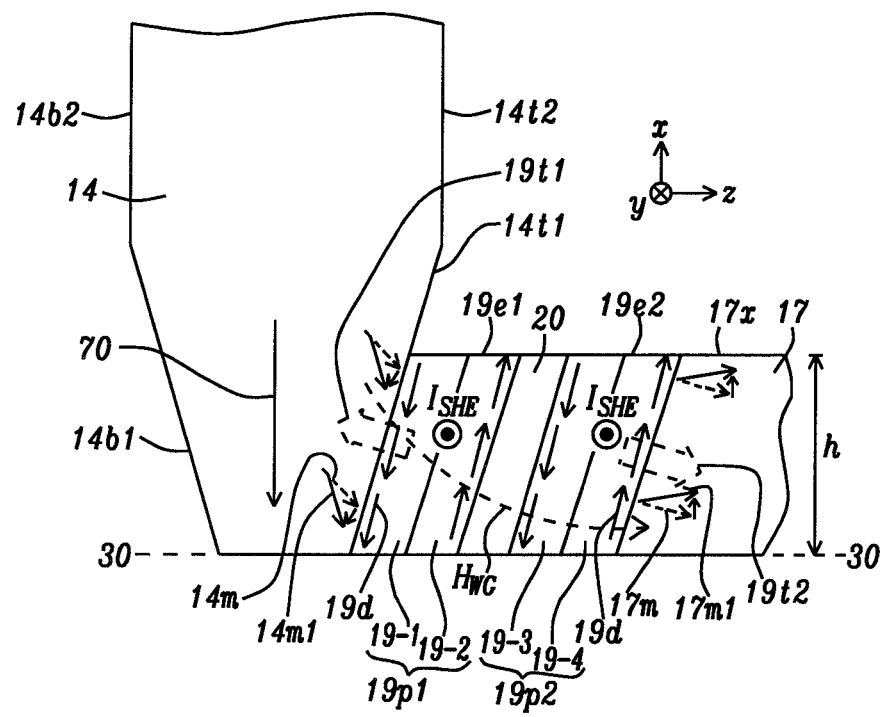
FIG. 10A and FIG. 10B are down-track cross-sectional views showing alternative embodiments to FIG. 7A and FIG. 7B, respectively, where each SHE layer that is a positive SHA material is comprised of two sub-layers.

Referring to FIG. 10A, the present disclosure also anticipates a fifth embodiment where each of SHE1 19*p*1 and SHE2 19*p*2 in the first embodiment may be comprised of a stack of at least two sub-layers so that the current density for $I_{SHE}$ in each sub-layer may be tuned. In the exemplary embodiment, SHE1 is comprised of first sub-layer 19-1 that contacts the MP trailing side 14t1, and second sub-layer 19-2 adjoining insulation layer 20. SHE2 has a lower sub-layer 19-3 formed on insulation layer 20 and an upper sub-layer 19-4 contacting TS bottom surface 17b. A key feature is that at least two SHE sub-layers 19-1 through 19-4 are made of different positive giant SHA materials. In some embodiments, each sub-layer may be made of a different SHA material than the other sub-layers. For example, SHE1 sub-layers may have a larger positive SHA than SHE2 sub-layers so that transverse spin transfer torque 19t1 is greater than transverse spin transfer torque 19t2 at the same $I_{SHE}$ current density.

Although the exemplary embodiment represents a modification of the first embodiment, one or both of SHE1 19p1 and SHE2 19p2 in the second through fourth embodiments may be a multilayer as well. Because of a closer proximity to MP 14 than SHE1 sub-layer 19-2, SHE1 sub-layer 19-1 is primarily responsible for generating transverse spin transfer torque 19t1 that tilts local MP magnetization 14m downward when the MP write field 70 is pointing down. Moreover, SHE2 sub-layer 19-4 is primarily responsible for producing transverse spin transfer torque 19t2 to tilt the local TS magnetization 17m upward to enhance the TS return field.

Figure 10B:
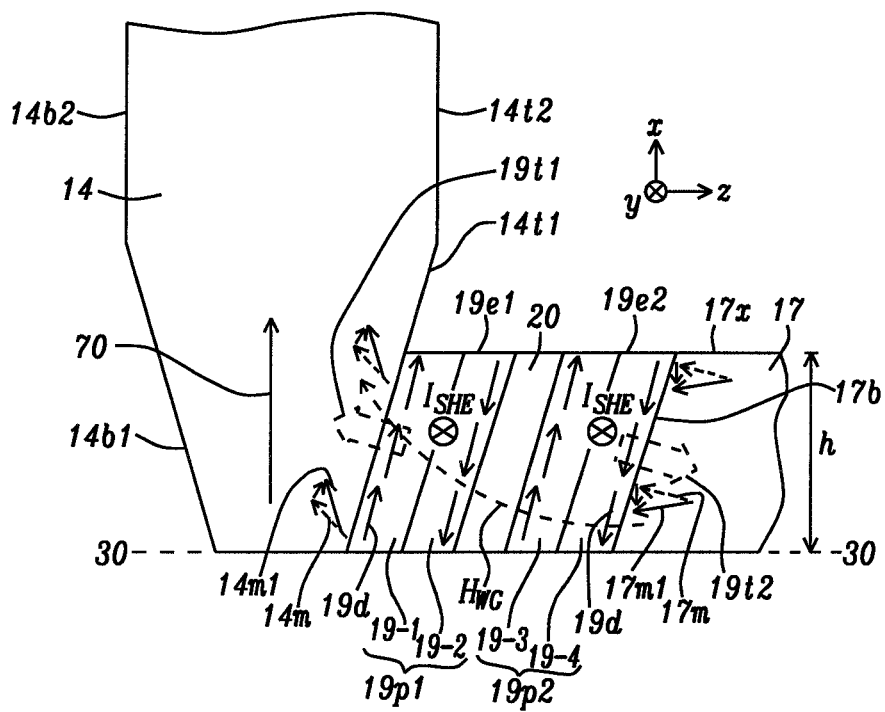

FIG. 10B is an alternative fifth embodiment where all aspects of FIG. 10A are retained except MP write field 70 is pointing up from the ABS 30-30, and $H_{WG}$, Oersted field 19d, as well as MP magnetization 14m, and TS magnetization 17m are in the opposite direction compared with FIG. 10A. $I_{SHE}$ in each of the SHE1 sub-layers 19-1, 19-2 and in each of the SHE2 sub-layers 19-3, 19-4 is reversed to a positive cross-track direction. As a result, transverse spin transfer torque 19t1 and 19t2 are generated to cause the desired tilt upward in MP magnetization 14m to provide MP magnetization 14m1 that enlarges the MP write field, and a tilt downward in TS magnetization 17m to yield TS magnetization 17m1 that enhances the TS return field.

Figure 11A:
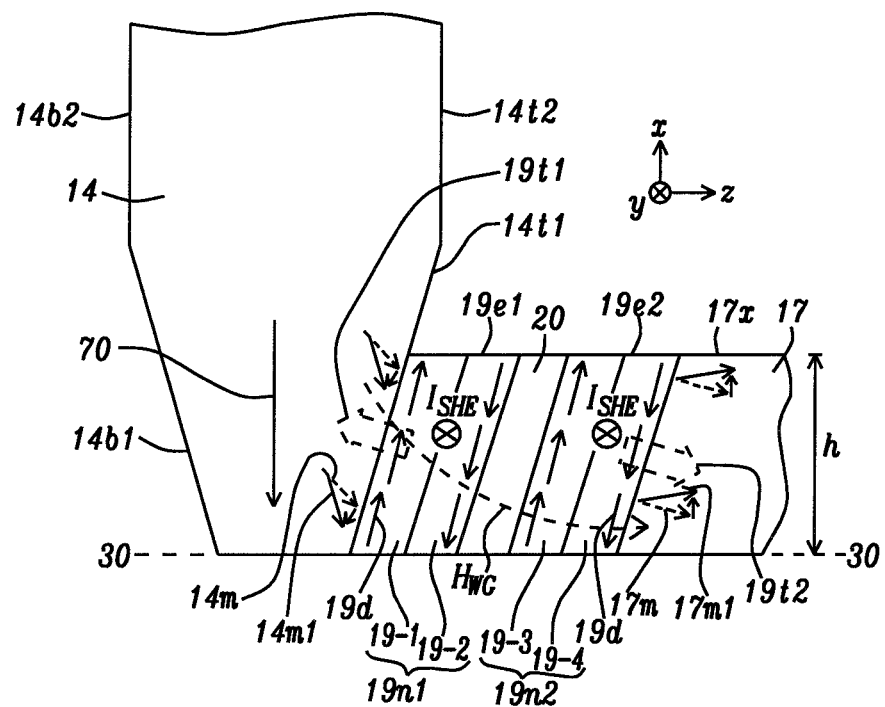
FIG. 11A and FIG. 11B are down-track cross-sectional views showing alternative embodiments to FIG. 7C and FIG. 7D, respectively, where each SHE layer that is a negative SHA material is comprised of two sub-layers.

An alternative fifth embodiment is shown in FIG. 11A where the first embodiment is modified so that each of SHE1 19n1 and SHE2 19n2 has at least two sub-layers. SHE1 has a first sub-layer 19-1 that contacts the MP trailing side 14t1, and second sub-layer 19-2 adjoining insulation layer 20. SHE2 has a lower sub-layer 19-3 formed on insulation layer 20 and an upper sub-layer 19-4 contacting TS bottom surface 17b. Preferably, at least two SHE sub-layers 19-1 through 19-4 are made of different negative giant SHA materials. In some embodiments, each sub-layer may be made of a different SHA material than the other sub-layers. For example, SHE1 sub-layers may have a larger negative SHA than SHE2 sub-layers so that transverse spin transfer torque 19t1 is greater than transverse spin transfer torque 19t2 at the same $I_{SHE}$ current density. One or both of SHE1 19n1 and SHE2 19n2 in the second through fourth embodiments may be a multilayer as well. SHE1 sub-layer 19-1 is primarily responsible for generating transverse spin transfer torque 19t1 that tilts local MP magnetization 14m downward when the MP write field 70 is pointing down. Moreover, SHE2 sub-layer 19-4 is primarily responsible for producing transverse spin transfer torque 19t2 to tilt the local TS magnetization 17m upward to enhance the TS return field.

The present disclosure also encompasses additional embodiments (not shown) wherein one of SHE1 19p1 and SHE2 19p2 is a single layer, and the other is a multilayer comprised of at least two sub-layers. When a primary consideration is to simplify the process flow as much as possible, a single layer for each of SHE1 and SHE2 is preferred. However, in some cases, a tradeoff may be necessary to tune the properties of one or both of SHE1 and SHE2 by adding one or more sub-layers that are comprised of at least one different SHA material.

Figure 11B:
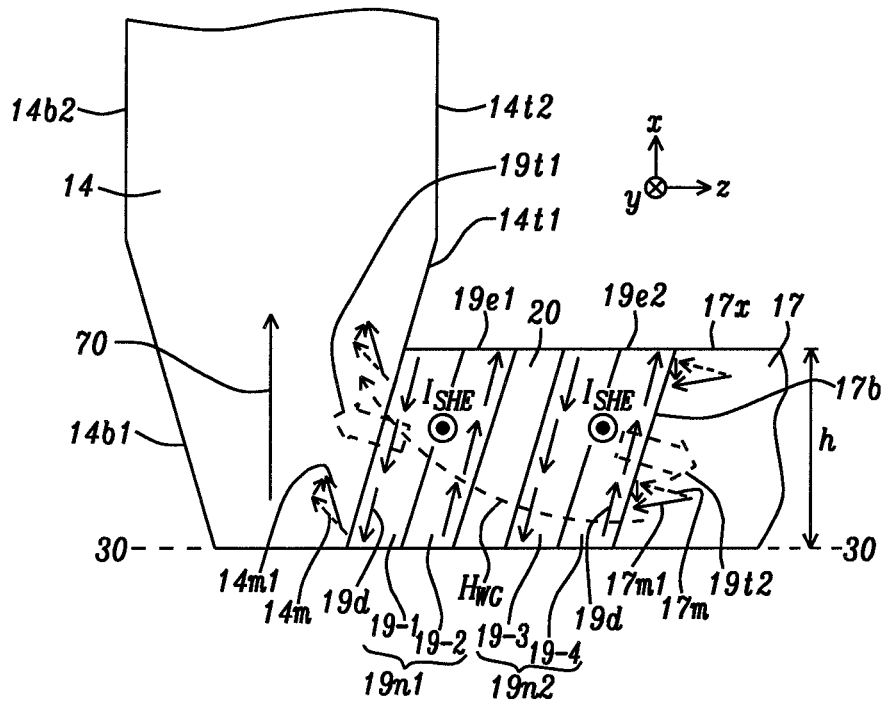

FIG. 11B is an alternative embodiment to FIG. 11A where all aspects are retained except MP write field 70 is pointing up from the ABS 30-30, and $H_{WS}$, Oersted field 19d, as well as MP magnetization 14m, and TS magnetization 17m are in the opposite direction compared with FIG. 11A. $I_{SHE}$ in each of the SHE1 sub-layers 19-1, 19-2, and in each of the SHE2 sub-layers 19-3, 19-4 is reversed to a negative cross-track direction. Thus, transverse spin transfer torque 19t1 and 19t2 are generated to cause the desired tilt upward in MP magnetization 14m that enlarges the MP write field, and a tilt downward in TS magnetization 17m that enhances the TS return field.

It should be understood that one or both of SHE1 and SHE2 in the second through fourth embodiments may be modified similar to the fifth embodiment to have a multilayer structure for one or both of the 19p1 and 19p2 layers, or for one or both of 19n1 and 19n2 layers depending on whether positive giant SHA materials, negative giant SHA materials, or one of a positive giant SHA material and one of a negative giant SHA material are used for SHE1 and SHE2.

Figure 12:
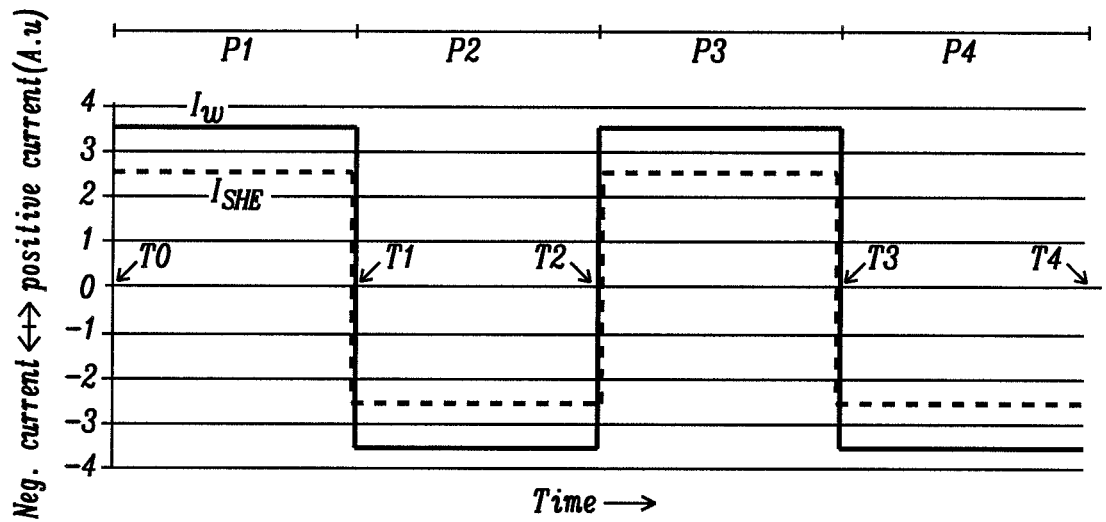
FIG. 12 is an Iw waveform showing that a current ($I_{SHE}$) applied through the SHE layer may be synchronized with the write current during each bit writing (transition) period according to an embodiment of the present disclosure.

Unlike the constant direct current used in MAMR and STRAMR devices, SHAMR devices require current $I_{SHE}$ in the SHE layers to synchronize with the Iw waveform and the $I_{SHE}$ current density may be time dependent. As depicted in FIG. 12, $I_{SHE}$ and Iw are plotted as a function of time during successive bit writing (transition) periods P1-P4. During P1 (between T0 and T1), both $I_{SHE}$ and Iw are shown with a positive polarity. At each of T0-T4, both $I_{SHE}$ and Iw are switched to an opposite polarity compared with the previous write period. In other embodiments (not shown), $I_{SHE}$ and Iw may have opposite polarity to provide an out of phase synchronization. Typically, $I_{SHE}$ is substantially less than Iw. For example, $I_{SHE}$ has a current density of about $10^8$-$10^9$ Amps/cm$^2$, and with a thickness of 8 nm for each of SHE1 and SHE2, and a height from a front side to backside of 60 nm, total current in SHE1 and SHE2 is around 1-6 mA zero-to-peak amplitude (AMP). Generally, Iw has zero-to-peak AMP of about 30-80 mA. Thus, at time t, the relationship between the two currents is expressed as $I_{SHE}(t)=K \times Iw(t)$ where K is a number between −1 and +1. K is time independent when the $I_{SHE}$ and Iw circuits are in series.

If the Iw and $I_{SHE}$ circuits are in parallel or controlled separately, K may be time dependent to a certain extent when there is an optimum SHE assist. In some embodiments, there may be an overshoot of $I_{SHE}(t)$ at T1, for instance, to realize a shorter $t_R$ depicted in FIG. 13. In other words, K may have a larger absolute value immediately after one or more of T0-T4, and then take on a smaller absolute value during $t_M$ after the MP field has completely switched from down to up, or from up to down.

Figure 13:
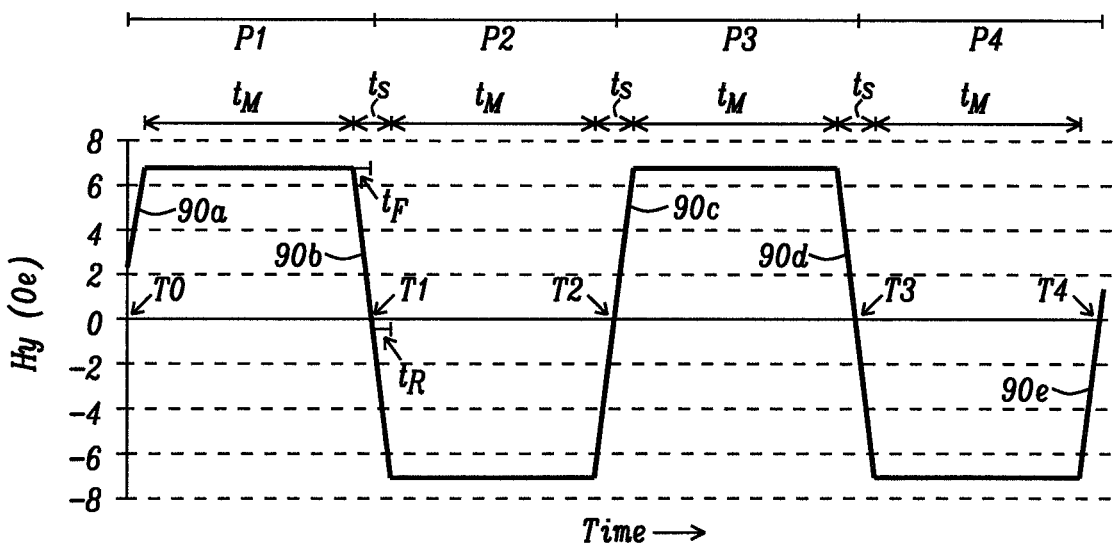
FIG. 13 shows switching time including fall time and rise time during the transition from writing one bit to the next bit.

Ideally, the Iw waveform is a step transition at each of T0-T4 in the absence of a SHAMR assist involving SHE technology described in the embodiments of the present disclosure. However, as shown in FIG. 13, during a typical Iw (+) to (−) polarity transition, the writer has a finite fall time ($t_F$) and finite rise time ($t_R$) during switching periods ($t_S$) between periods ($t_M$) where a maximum Hy field is realized and the MP write field is orthogonal to the ABS (not shown). As a result, each switching period is represented in the Iw waveform by slopes 90a-90e that are non-vertical.

Without a SHAMR assist, MP magnetization will follow the Iw transition, but with a finite time delay ($t_R$), usually at the sub-nanosecond time scale. After each of T0-T4, MP write field 70 (FIG. 6B for example) is not switched to an opposite direction from the previous write period until the end of $t_R$.

Referring again to FIG. 7A where there is a SHAMR assist with a positive giant SHA material in SHE1 and SHE2, spin current is built up in SHE1 and is generating transverse spin torque 19t1 to rotate local MP magnetization 14m toward the ABS 30-30 within 1 to tens of picoseconds after current $I_{SHE}$ direction is reversed. Accordingly, transverse spin torque works together with the Iw induced field to flip the MP write field direction thereby yielding a shorter rise time ($t_R$), which means each of the slopes 90a-90e (FIG. 13) will be more vertical than when no SHAMR assist is applied. Each of the other SHAMR embodiments described herein also provide a decreased rise time.

In actual practice, there is an overshoot in Iw immediately after a transition to ensure a fast rise time in a conventional PMR writer. Using a SHAMR assist according to an embodiment of the present disclosure, an overshoot in current through the SHE layers would increase transverse spin transfer torque as well. Faster rise time with a SHAMR assist will improve the writer's transition speed and provide better transition sharpness as an additional advantage to enhancing the MP write field, and boosting the TS return field in all embodiments.

In a SHAMR device design where $I_{SHE}$ is synchronized with Iw, there is a possibility of maintaining the number of pads used in a conventional PMR writer. Depending on the resistance of SHE1 and SHE2, and the leads to the SHE1 and SHE2 layers, the circuit for applying $I_{SHE}$ may be in series or in parallel with the Iw circuit. In other words, the SHAMR current input may be applied across the Iw pads to avoid adding new pads dedicated to the $I_{SHE}$ circuit. In yet another embodiment, the $I_{SHE}$ circuit and Iw circuit may be controlled independently with the use of additional pads for the $I_{SHE}$ circuit.

Figure 14:
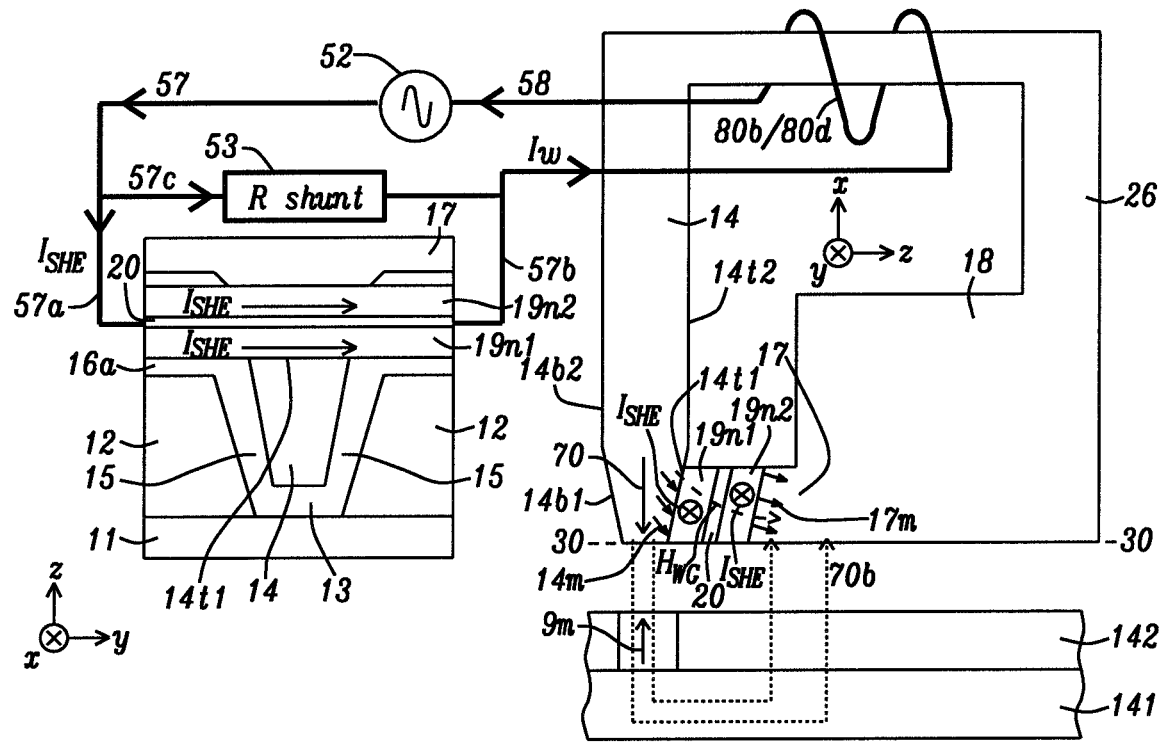
FIG. 14 is a schematic view of an $I_{SHE}$ circuit configured in series with an Iw circuit according to an embodiment of the present disclosure.

FIG. 14 is a schematic drawing illustrating an $I_{SHE}$ circuit configured in series with the Iw circuit. The SHAMR device features in FIGS. 6A-6B are retained except the write shield (WS) 18 is now shown on TS 17, and connects with PP3 trailing shield 26. There is typically a top yoke (TY) between the PP3 trailing shield and MP 14 but the TY is omitted in this drawing. In the exemplary embodiment, SHE1 19n1 and SHE2 19n2 are illustrated and have $I_{SHE}$ in the positive cross-track direction. Optionally, SHE1 19p1 and SHE2 19p2 will each have $I_{SHE}$ in the opposite (negative y-axis) direction. Since both circuits are difficult to depict from a single vantage point, the $I_{SHE}$ circuit is shown in an ABS view on the left side of the drawing and comprises current outflow 57 from source 52, lead 57a to one side of SHE1 and SHE2 and lead 57b from the opposite side of SHE1 and SHE2. An R shunt 53 is used to divide the current outflow 57 into two paths so that the current in lead 57a may be different from the current in lead 57c through the R shunt. The Iw circuit on the right side of the diagram is a down-track cross-sectional view at the center plane in FIG. 6A and comprises leads 57, 57c, coils 80b/80d for generating flux in MP 14, and return lead 58 back to the source.

For embodiments (not shown) where one of SHE1 is a positive SHA material and the other of SHE2 is a negative SHA material, there is a scheme for a connection in series, and a layout for a connection of Iw and $I_{SHE}$ in series. For example, when SHE1 is a positive SHA material and SHE2 is a negative SHA material, a parallel connection between SHE1 and SHE2 comprises splitting a "positive current lead" that is connected to the left side of SHE1 and to the right side of SHE2. Furthermore, the "negative lead" is connected to the right side of SHE1 and to the left side of SHE2. For connections of SHE1 and SHE2 in series, positive current lead is connected to the left side of SHE1, and the right side of SHE1 is shorted to the right side of SHE2 while the left side of SHE2 is connected to the negative lead.

When both SHE1 and SHE2 are a negative SHA material, the "positive lead" that was connected to the left side of SHE1 in the aforementioned example is now attached to the right side of both SHE1 and SHE2. Actual drawings for all embodiments are not provided since those skilled in the art will appreciate the appropriate connections for "negative" and "positive" leads to SHE1 and SHE2.

Figure 15:
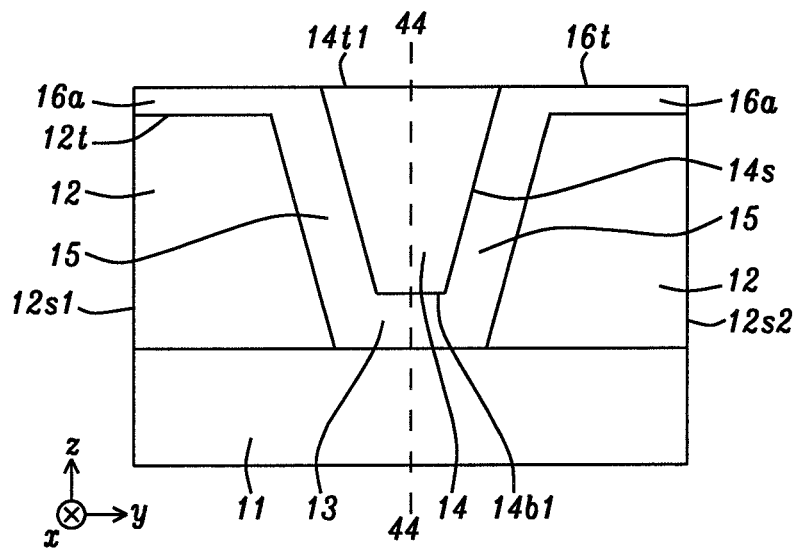
FIGS. 15-17 depict ABS views of a process flow where a SHE1/insulation layer/SHE2 stack is formed between a MP trailing side and TS bottom surface according to an embodiment of the present disclosure.
Figure 16:
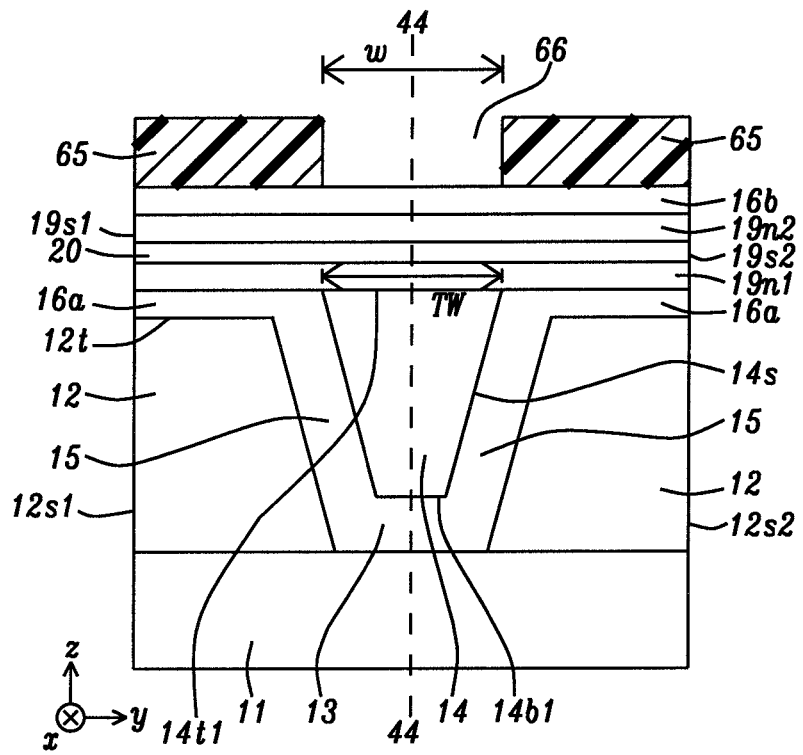
Figure 17:
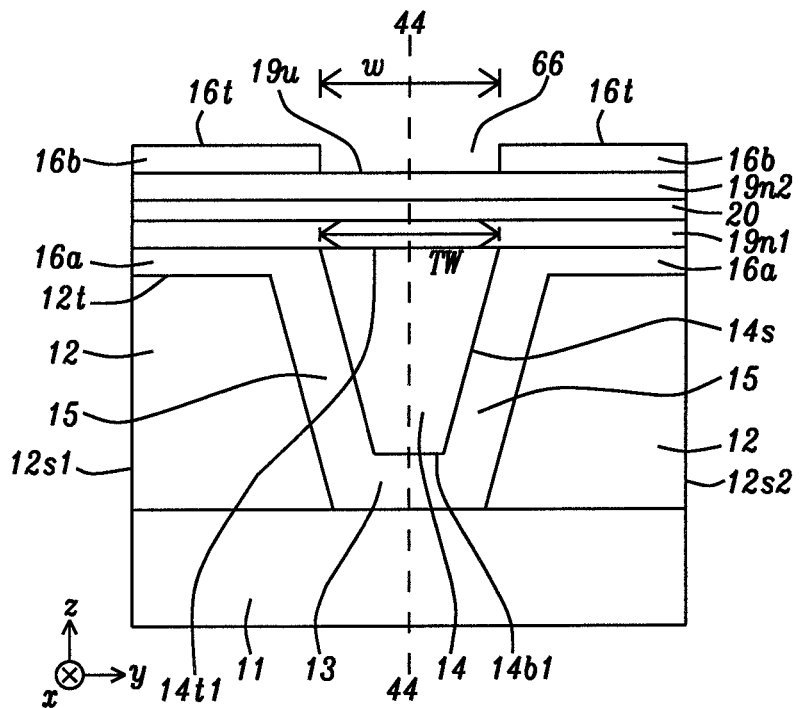

The present disclosure also encompasses a process sequence for fabricating a stack of SHE1/insulation layer/SHE2 in a write gap according to various embodiments described herein and is provided in the ABS views of FIGS. 15-17. The partially formed SHAMR device comprising MP 14 that adjoins side gaps 15 and leading gap 13 in FIG. 15 is provided according to a conventional process sequence. Side shield top surfaces 12t are covered with WG layer 16a having top surface 16t that is coplanar with a front edge of the MP tapered trailing side 14t1. Side shields 12 have an outer side 12s1 and 12s2 on opposite sides of center plane 44-44.

Referring to FIG. 16, SHE1 19n1, insulation layer 20, SHE2 19n2, and WG layer 16b are sequentially deposited on MP trailing side 14t1 and on top surface 16t of WG layer 16a. It should be understood that one or both of SHE1 and SHE2 may be a positive SHA material resulting in SHE1 19p1 and SHE2 19p2 according to other embodiments of the present disclosure. Note that SHE1 and SHE2 have a full width between outer sides 19s1 and 19s2 that are aligned to be coplanar with the far sides 12s1 and 12s2, respectively, of side shields 12. Thus, no etching is required to pattern SHE1 and SHE2 in the cross-track direction, which is an advantage for the SHAMR device over other devices based on SHE technology that are used in the art. As indicated earlier, formation of the SHE1/insulation layer/SHE2 stack requires fewer process steps than fabricating a STO device that is comprised of three or more layers in MAMR or STRAMR devices because of at least one less etching step. Thereafter, a photoresist layer is coated on WG layer 16b and patternwise exposed and developed to provide a photoresist mask 65 having an opening 66 with cross-track width w of 30 nm to 150 nm that is bisected by plane 44-44. The opening exposes a center portion of WG layer 16b above the MP trailing side having track width (TW) where TW≤w. In other embodiments (not shown), TW may be larger than w.

In FIG. 17, the photoresist mask pattern is etch transferred through WG layer 16b using a reactive ion etch (RIE) or ion beam etch (IBE) process, for example, thereby exposing a center portion of the top surface 19u of SHE2 19n2. The photoresist mask is removed with a conventional process to provide a top surface 16t of WG layer 16b on each side of opening 66. Thereafter, a conventional sequence of steps are followed including depositing TS 17 and overlying layers in the write head before a lapping process is performed to yield the PMR writer shown in FIG. 5 with a SHAMR configuration.

In all SHAMR device embodiments described herein, kilo flux change per inch (kFCI) and area density capability (ADC) are expected to improve with one or both of MP write field enhancement (better overwrite property), and enhanced TS return field (better BER).

While the present disclosure has been particularly shown and described with reference to, the preferred embodiments thereof, it will be understood by those skilled in the art that various changes in form and details may be made without departing from the spirit and scope of this disclosure.

We claim:

1. A Spin Hall Effect (SHE) assisted magnetic recording (SHAMR) device, comprising:
    (a) a main pole (MP) that is configured to generate a magnetic write field in a MP tip with a front side at an air bearing surface (ABS), and having a local magnetization proximate to a MP trailing side that adjoins a write gap (WG) and faces a trailing shield;
    (b) the trailing shield (TS) with a front side at the ABS, and a local magnetization proximate to a bottom surface that faces the MP;
    (c) a first Spin Hall Effect (SHE1) layer formed in the WG and on the MP trailing side, and having a top surface adjoining an insulation layer, and comprised of a Spin Hall Angle (SHA) material, wherein the SHE1 layer is configured to generate a first transverse spin transfer torque that tilts the local MP magnetization to a direction that is more parallel to the MP write field thereby enhancing the MP write field; and
    (d) a second Spin Hall Effect (SHE2) layer formed on the insulation layer and having a top surface that contacts the TS bottom surface, and comprised of a SHA material, wherein the SHE2 layer is configured to generate a second transverse spin transfer torque that tilts the local TS magnetization to a direction that is more orthogonal to the ABS to increase a TS return field.

2. The SHAMR device of claim 1 wherein each of the SHE1 and SHE2 layers is comprised of a positive giant SHA material having an absolute value for SHA that is >0.05, and wherein the SHAMR device is configured to apply a current ($I_{SHE}$) across each of the SHE1 and SHE2 layers in a negative cross-track direction when the MP write field has direction that is out of the MP tip to a magnetic medium, and is configured to apply $I_{SHE}$ across each of the SHE1 and SHE2 layers in a positive cross-track direction when the MP write field direction is into the MP tip from the magnetic medium.

3. The SHAMR device of claim 1 wherein each of the SHE1 and SHE2 layers is comprised of a negative giant SHA material having an absolute value for SHA that is >0.05, and wherein the SHAMR device is configured to apply a current ($I_{SHE}$) across each of the SHE1 and SHE2 layers in a positive cross-track direction when the MP write field has direction that is out of the MP tip to a magnetic medium, and is configured to apply $I_{SHE}$ across each of the SHE1 and SHE2 layers in a negative cross-track direction when the MP write field direction is into the MP tip from the magnetic medium.

4. The SHAMR device of claim 1 wherein one of the SHE1 and SHE2 layers is comprised of a negative giant SHA material and the other of the SHE1 and SHE2 layers is comprised of a positive giant SHA material wherein each of the SHE1 and SHE2 layers has an absolute value for SHA that is >0.05, and wherein the SHAMR device is configured to apply a current ($I_{SHE}$) across the negative giant SHA material in a positive cross-track direction and across the positive giant SHA material in a negative cross-track direction when the MP write field has a direction out of the MP tip to a magnetic medium, and is configured to apply $I_{SHE}$ across the negative giant SHA material in a negative cross-track direction and across the positive giant SHA material in a positive cross-track direction when the MP write field has a direction into the MP tip from the magnetic medium.

5. The SHAMR device of claim 1 wherein said SHAMR device is configured to apply a current ($I_{SHE}$) in a cross-track direction across each of the SHE1 and SHE2 layers, and is configured to synchronize $I_{SHE}$ with a write current (Iw) that is applied through a Iw circuit comprised of Iw pads and generates the MP write field such that a polarity of both $I_{SHE}$ and Iw are switched when a new transition is written.

6. The SHAMR device of claim 5 wherein $I_{SHE}$ is also applied across the Iw pads so that an $I_{SHE}$ circuit is in parallel or in series with the Iw circuit.

7. The SHAMR device of claim 6 wherein the $I_{SHE}$ and Iw circuits are connected in series, and a relationship between $I_{SHE}$ and Iw is expressed as $I_{SHE}(t)=K \times Iw(t)$ where K is a number between −1 and +1 that is time independent, and t is time.

8. The SHAMR device of claim 6 wherein the $I_{SHE}$ and Iw circuits are connected in parallel, or controlled independently, and a relationship between $I_{SHE}$ and Iw is expressed as $I_{SHE}(t)=K \times Iw(t)$ where K is a number between −1 and +1 that is time dependent, and t is time.

9. The SHAMR device of claim 1 wherein each of the SHE1 and SHE2 layers has a front side at the ABS.

10. The SHAMR device of claim 1 wherein the SHE1 layer has a front side that is recessed to a height r1 from the ABS, and the SHE2 layer has a front side that is recessed to a height r2 from the ABS, and wherein each of r1 and r2 is from 20 nm to 80 nm.

11. The SHAMR device of claim 5 wherein the SHAMR device is configured so that $I_{SHE}$ has no threshold current density requirement in order to generate the first and second transverse spin transfer torque.

12. The SHAMR device of claim 1 wherein the SHE1 layer has a down-track thickness t1 and the SHE2 layer has a down-track thickness t2, wherein each of t1 and t2 is from 4 nm to 12 nm.

13. The SHAMR device of claim 1 wherein the insulation layer has a thickness of at least 3 nm.

14. The SHAMR device of claim 1 wherein each of the SHE1 and SHE2 layers has a backside at a first height that is less than or equal to a throat height of a TS backside.

15. The SHAMR device of claim 14 wherein the first height is <80 nm from the ABS.

16. A head gimbal assembly (HGA), comprising:
    (a) the SHAMR device of claim 1; and
    (b) a suspension that elastically supports the SHAMR device, wherein the suspension has a flexure to which the SHAMR device is joined, a load beam with one end connected to the flexure, and a base plate connected to the other end of the load beam.

17. A magnetic recording apparatus, comprising:
    (a) the HGA of claim 16;
    (b) a magnetic recording medium positioned opposite to a slider on which the SHAMR device is formed;
    (c) a spindle motor that rotates and drives the magnetic recording medium; and
    (d) a device that supports the slider, and that positions the slider relative to the magnetic recording medium.

18. A Spin Hall Effect (SHE) assisted magnetic recording (SHAMR) device, comprising:
    (a) a main pole (MP) that is configured to generate a magnetic write field in a MP tip with a front side at an air bearing surface (ABS), and having a local magnetization proximate to a MP trailing side that adjoins a write gap (WG) and faces a trailing shield;

(b) the trailing shield (TS) with a front side at the ABS, and a local magnetization proximate to a TS bottom surface that faces the MP;

(c) a first Spin Hall Effect (SHE1) layer formed on the MP trailing side and comprised of at least two sub-layers each made of a Spin Hall Angle (SHA) material and wherein the SHE1 layer is configured to generate a first transverse spin transfer torque that tilts the local MP magnetization to a direction that is more parallel to the MP write field thereby enhancing the MP write field;

(d) an insulation layer on the SHE1 layer; and (e) a second Spin Hall Effect (SHE2) layer formed on the insulation layer and comprised of at least two sub-layers each made of a SHA material, wherein the SHE2 layer is configured to generate a second transverse spin transfer torque that tilts the local TS magnetization to a direction that is more orthogonal to the ABS thereby increasing the TS return field.

19. The SHAMR device of claim 18 wherein each of the SHE1 and SHE2 layers is comprised of a positive giant SHA material having an absolute value for SHA that is >0.05, and wherein the SHAMR device is configured to apply a current ($I_{SHE}$) across each of the SHE1 sub-layers and SHE2 sub-layers in a negative cross-track direction when the MP write field has direction that is out of the MP tip to a magnetic medium, or is configured to apply $I_{SHE}$ across each of the SHE1 sub-layers and SHE2 sub-layers in a positive cross-track direction when the MP write field direction is into the MP tip from the magnetic medium.

20. The SHAMR device of claim 18 wherein each of the SHE1 and SHE2 layers is comprised of a negative giant SHA material having an absolute value for SHA that is >0.05, and wherein the SHAMR device is configured to apply a current ($I_{SHE}$) across each of the SHE1 sub-layers and SHE2 sub-layers in a positive cross-track direction when the MP write field has direction that is out of the MP tip to a magnetic medium, or is configured to apply $I_{SHE}$ across each of the SHE1 sub-layers and SHE2 sub-layers in a negative cross-track direction when the MP write field direction is into the MP tip from the magnetic medium.

21. The SHAMR device of claim 18 wherein one of the SHE1 and SHE2 layers is comprised of a negative giant SHA material and the other of the SHE1 and SHE2 layers is comprised of a positive giant SHA material wherein each of the SHE1 and SHE2 layers has an absolute value for SHA that is >0.05, and wherein the SHAMR device is configured to apply a current ($I_{SHE}$) across the negative giant SHA material in a positive cross-track direction and across the positive giant SHA material in a negative cross-track direction when the MP write field has a direction out of the MP tip to a magnetic medium, or is configured to apply $I_{SHE}$ across the negative giant SHA material in a negative cross-track direction and across the positive giant SHA material in a positive cross-track direction when the MP write field has a direction into the MP tip from the magnetic medium.

22. The SHAMR device of claim 18 wherein the SHAMR device is configured to apply a current ($I_{SHE}$) in a cross-track direction across the SHE1 and SHE2 layers to generate the first and second transverse spin transfer torque, and is configured to synchronize $I_{SHE}$ with a write current (Iw) that is applied through an Iw circuit comprised of Iw pads and generates the MP write field such that a polarity of both of $I_{SHE}$ and Iw is switched when a new transition is written.

23. The SHAMR device of claim 22 wherein $I_{SHE}$ is also applied across the Iw pads so that an $I_{SHE}$ circuit is in parallel or in series with the Iw circuit.

24. The SHAMR device of claim 18 wherein each of the SHE1 and SHE2 layers has a front side at the ABS.

25. The SHAMR device of claim 18 wherein the SHE1 layer has a front side that is recessed to a height r1 from the ABS, and the SHE2 layer has a front side that is recessed to a height r2 from the ABS, and wherein each of r1 and r2 is from 20 nm to 80 nm.

26. The SHAMR device of claim 18 wherein each of the SHE1 and SHE2 layers has a backside at a first height that is less than or equal to a throat height of a TS backside.

27. The SHAMR device of claim 26 wherein the first height is <80 nm from the ABS.

28. The SHAMR device of claim 22, wherein the SHAMR device is configured so that $I_{SHE}$ has no threshold current density requirement in order to generate the first and second transverse spin transfer torque.

29. The SHAMR device of claim 22 wherein the $I_{SHE}$ and Iw circuits are connected in series, and a relationship between $I_{SHE}$ and Iw is expressed as $I_{SHE}(t)=K \times Iw(t)$ where K is a number between −1 and +1 that is time independent, and t is time.

30. The SHAMR device of claim 22 wherein the $I_{SHE}$ and Iw circuits are connected in parallel or controlled independently, and a relationship between $I_{SHE}$ and Iw is expressed as $I_{SHE}(t)=K \times Iw(t)$ where K is a number between −1 and +1 that is time dependent, and t is time.

31. The SHAMR device of claim 18 wherein the SHE1 layer has a down-track thickness t1 and the SHE2 layer has a down-track thickness t2, wherein each of t1 and t2 is from 4 nm to 12 nm.

32. The SHAMR device of claim 18 wherein the insulation layer has a thickness of at least 3 nm.

33. A head gimbal assembly (HGA), comprising:
(a) the SHAMR device of claim 18; and
(b) a suspension that elastically supports the SHAMR device, wherein the suspension has a flexure to which the SHAMR device is joined, a load beam with one end connected to the flexure, and a base plate connected to the other end of the load beam.

34. A magnetic recording apparatus, comprising:
(a) the HGA of claim 33;
(b) a magnetic recording medium positioned opposite to a slider on which the SHAMR device is formed;
(c) a spindle motor that rotates and drives the magnetic recording medium; and
(d) a device that supports the slider, and that positions the slider relative to the magnetic recording medium.

35. A method of forming a Spin Hall Effect (SHE) assisted magnetic recording (SHAMR) device, comprising:
(a) providing a main pole (MP) with a tapered trailing side having a front edge that is a track width (TW) at an air bearing surface (ABS) plane, and wherein the MP is separated from a side shield on each side of a center plane by a side gap, and wherein a first write gap (WG) layer is formed on a side shield top surface and on the side gap on each side of a center plane that is orthogonal to the ABS and bisects the MP tapered trailing side;
(b) sequentially depositing a first SHE layer, an insulation layer, a second SHE layer, and a second WG layer on the first WG layer and MP tapered trailing side, wherein each of the first and second SHE layers is comprised of a Spin Hall Angle (SHA) material having an absolute value for SHA≥0.05;
(c) forming an opening in the second WG layer with a photoresist patterning and etching sequence wherein the opening is bisected by the center plane and exposes a second SHE layer center portion having width w where $w \geq TW$; and (d) depositing a trailing shield (TS) on the second WG layer and that fills the opening such that the TS contacts the second SHE layer center portion.

36. The method of claim 35 wherein each of the first and second SHE layers is comprised of a positive giant SHA material, or each of the first and second SHE layers is made of a negative giant SHA material.

37. The method of claim 35 wherein one of the first and second SHE layers is comprised of a positive giant SHA material, and the other of the first and second SHE layers is made of a negative giant SHA material.

38. The method of claim 35 wherein each of the first and second SHE layers has a front side at the ABS and extends to a backside at a height up to 80 nm in a direction orthogonal to the ABS.

39. The method of claim 35 wherein each of the first and second SHE layers has a front side that is recessed to a height of 20 nm to 80 nm from the ABS.

40. The method of claim 35 wherein a side of each of the first and second SHE layers is coplanar with a far side of the side shield on each side of the center plane.

41. The method of claim 35 wherein w is from 30 nm to 150 nm.

* * * * *